United States Patent
Ke et al.

(10) Patent No.: US 12,217,382 B2
(45) Date of Patent: *Feb. 4, 2025

(54) MULTI-SCALE TRANSFORMER FOR IMAGE ANALYSIS

(71) Applicant: Google LLC, Mountain View, CA (US)

(72) Inventors: Junjie Ke, East Palo Alto, CA (US); Feng Yang, Sunnyvale, CA (US); Qifei Wang, Mountain View, CA (US); Yilin Wang, Sunnyvale, CA (US); Peyman Milanfar, Menlo Park, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/527,528

(22) Filed: Dec. 4, 2023

(65) Prior Publication Data
US 2024/0119555 A1    Apr. 11, 2024

Related U.S. Application Data

(63) Continuation of application No. 17/787,699, filed as application No. PCT/US2021/040111 on Jul. 1, 2021, now Pat. No. 11,887,270.

(51) Int. Cl.
*G06K 9/00* (2022.01)
*G06T 3/04* (2024.01)
(Continued)

(52) U.S. Cl.
CPC ............ *G06T 3/04* (2024.01); *G06T 3/40* (2013.01); *G06T 7/0002* (2013.01);
(Continued)

(58) Field of Classification Search
CPC ....... G06T 3/0012; G06T 3/40; G06T 7/0002; G06T 2207/20016; G06T 2207/20081; G06T 2207/30168
(Continued)

(56) References Cited

U.S. PATENT DOCUMENTS

2016/0035078 A1   2/2016   Lin et al.
2023/0281959 A1*  9/2023   Hoshen .............. G06N 3/045
                                              382/225

FOREIGN PATENT DOCUMENTS

CN    110728219 A    1/2020
CN    112017198 A    12/2020
(Continued)

OTHER PUBLICATIONS

International Search Report and Written Opinion for Application No. PCT/US2022/021539 dated May 2, 2022.
(Continued)

*Primary Examiner* — Jonathan S Lee
(74) *Attorney, Agent, or Firm* — Botos Churchill IP Law

(57) ABSTRACT

The technology employs a patch-based multi-scale Transformer (300) that is usable with various imaging applications. This avoids constraints on image fixed input size and predicts the quality effectively on a native resolution image. A native resolution image (304) is transformed into a multi-scale representation (302), enabling the Transformer's self-attention mechanism to capture information on both fine-grained detailed patches and coarse-grained global patches. Spatial embedding (316) is employed to map patch positions to a fixed grid, in which patch locations at each scale are hashed to the same grid. A separate scale embedding (318) is employed to distinguish patches coming from different scales in the multiscale representation. Self-attention (508) is performed to create a final image representation. In some instances, prior to performing self-attention, the system may prepend a learnable classification token (322) to the set of input tokens.

22 Claims, 21 Drawing Sheets

(51) Int. Cl.
   *G06T 3/40*         (2006.01)
   *G06T 7/00*         (2017.01)
(52) U.S. Cl.
   CPC ............... *G06T 2207/20016* (2013.01); *G06T 2207/20081* (2013.01); *G06T 2207/30168* (2013.01)
(58) Field of Classification Search
   USPC .......................................................... 382/155
   See application file for complete search history.

(56) References Cited

FOREIGN PATENT DOCUMENTS

| | | |
|---|---|---|
| CN | 112132844 A | 12/2020 |
| CN | 112184577 A | 1/2021 |
| CN | 112287940 A | 1/2021 |

OTHER PUBLICATIONS

International Search Report and Written Opinion for Application No. PCT/US21/40111 dated Mar. 31, 2022 (14 pages).

International Search Report and Written Opinion issued in International Patent Application No. PCT/US2022/021539, mailed Nov. 3, 2022, 15 pages.

Liu, Zhengyi, et al. "TriTransNet: RGB-D salient object detection with a triplet transformer embedding network." Proceedings of the 29th ACM international conference on multimedia. 2021. (Year: 2021).

Wang, Wenhai, et al. "Pyramid Vision Transformer: A Versatile Backbone for Dense Prediction without Convolutions." arXiv preprint arXiv:2102.12122 (2021). (Year: 2021).

You, Junyong, and Jari Korhonen. "Transformer for Image Quality Assessment." arXiv preprint arXiv:2101.01097 (2020). (Year: 2021).

Zhang, Pengchuan, et al. "Multi-Scale Vision Longformer: A New Vision Transformer for High-Resolution Image Encoding." arXiv preprint arXiv:2103.15358 (2021). (Year: 2021).

Zhu, Chen, et al. "Long-short transformer: Efficient transformers for language and vision." Advances in neural information processing systems 34 (2021): 17723-17736. (Year: 2021).

Chen, Quiyu, et al., "Adaptive Fractional Dilated Convolution Network for Image Aesthetics Assessment", arXiv:2004.03015v1, Apr. 6, 2020, pp. 1-10.

Chen, Chun-Fu, et al., "CrossViT: Cross-Attention Multi-Scale Vision Transformer for Image Classification", arxiv.org, Cornell University Library, 201 Olin Library Cornell University Ithaca, NY 14853, Mar. 27, 2021, pp. 1-12.

Chen, Chun-Fu, et al., "RegionViT: Regional-to-Local Attention for Vision Transformers", arxiv.org, Cornell University Library, 201 Olin Library Cornell University Ithaca, NY 14853, Jun. 4, 2021, pp. 1-14.

Cheon, Manri, et al., "Perceptual Image Quality Assessment with Transformers", arxiv.org, May 5, 2021, pp. 1-10.

Devlin, Jacob, et al., "BERT: Pre-training of Deep Bidirectional Transformers for Language Understanding", arXiv:1810.04805v2 [cs.CL] May 24, 2019, pp. 1-16.

Dosovitskiy, Alexey, et al., "an Image Is Worth 16X16 Words: Transformers for Image Recognition At Scale", arXiv:2010.11929v1 [cs.CV] Oct. 22, 2020, pp. 1-21.

Fan, Haoqi, et al., "Multiscale Vision Transformers", arxiv.org, Cornell University Library, 201 Olin Library Cornell University Ithaca, NY 14853, Apr. 22, 2021, 18 pages.

Fang, Yuming, et al., "Perceptual Quality Assessment of Smartphone Photography", Computer Vision Foundation, 2020, pp. 3677-3686.

Khan, Salman, et al., "Transformers in Vision: A Survey", ACM Computing Surveys, ACM, New York, NY, US, US, Jan. 1, 1990, pp. 1-38.

Li, Yezhou, et al., "Image quality assessment using deep convolutional networks", AIP Advances 7, 125324 (2017), pp. 1-12.

Li, Yanghao, et al., "Improved Multiscale Vision Transformers for Classification and Detection", arxiv.org, Cornell University Library, 201 Olin Library Cornell University Ithaca; NY 14853, Dec. 2, 2021, 16 pages.

Lin, Huan, et al., "Complex Event Recognition via Spatial-Temporal Relation Graph Reasoning", 2021 International Conference on Visual Communications and .Image Processing (VCIP), IEEE, Dec. 5, 2021, pp. 1-5, XP034069666, DOI: 10;1109/VCIP53242.2021.9675337 [retrieved on Jan. 7, 2022-].

Mai, Long, et al., "Composition-preserving Deep Photo Aesthetics Assessment", Computer Vision Foundation, 2016, pp. 497-506.

Shaolin, Su, et al., "Blindly Assess Image Quality in the Wild Guided by A Self-Adaptive Hyper Network", Computer Vision Foundation, 2020, pp. 3667-3676.

Talebi, Hossein, et al., "NIMA: Neural Image Assessment", arXiv:1709.05424v2 [cs.CV] Apr. 26, 2018, pp. 1-15.

Vaswani, Ashish, et al., "Attention Is All You Need", arXiv:1706.03762v5 [cs.CL] Dec. 6, 2017, pp. 1-15.

Vlad, Hosu, et al., "Effective Aesthetics Prediction with Multi-level Spatially Pooled Features", arXiv:1904.01382v1 [cs.CV] Apr. 2, 2019, pp. 1-9.

Xing,, Fengchuang, et al., "StarVQA: Space-Time Attention for Video Quality Assessment", arxiv.org, Cornell University Library, 201 Olin Library Cornell University Ithaca, NY 14853, Aug. 22, 2021, 6 pages.

Zhenqiang, Ying, et al., "From Patches to Pictures (PaQ-2-PiQ): Mapping the Perceptual Space of Picture Quality", arXiv:1912.10088v1 [cs.CV] Dec. 20, 2019, pp. 1-16.

Zhu, Xizhou, et al., "Deformable DETR: Deformable Transformers for End-to-End Object Detection", arxiv.org, Cornell University Library, 201 Olin Library Cornell University Ithaca, NY 14853, Nov. 30, 2020, pp. 1-12.

Zuo, Enguang, et al., "Context-Specific Heterogeneous Graph Convolutional Network for Implicit Sentiment Analysis", IEEE Access, vol. 8, Feb. 2020, pp. 37967-37975.

Notice of Allowance for Chinese Patent Application No. 202180100108.6, Jun. 26, 2024, 8 Pages.

\* cited by examiner

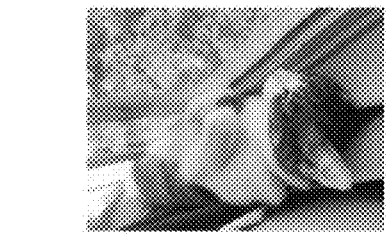
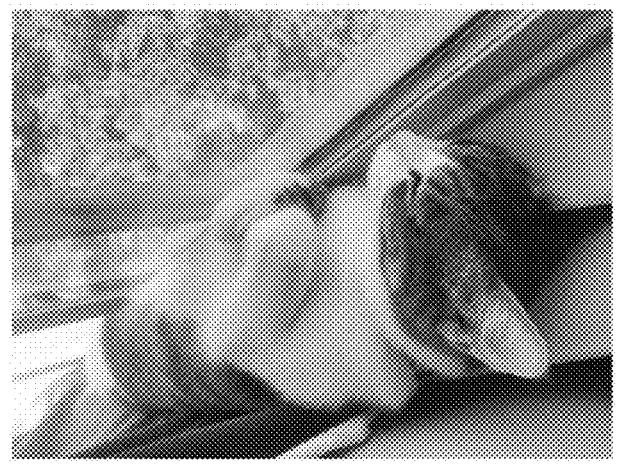
Fig. 4A
400

410

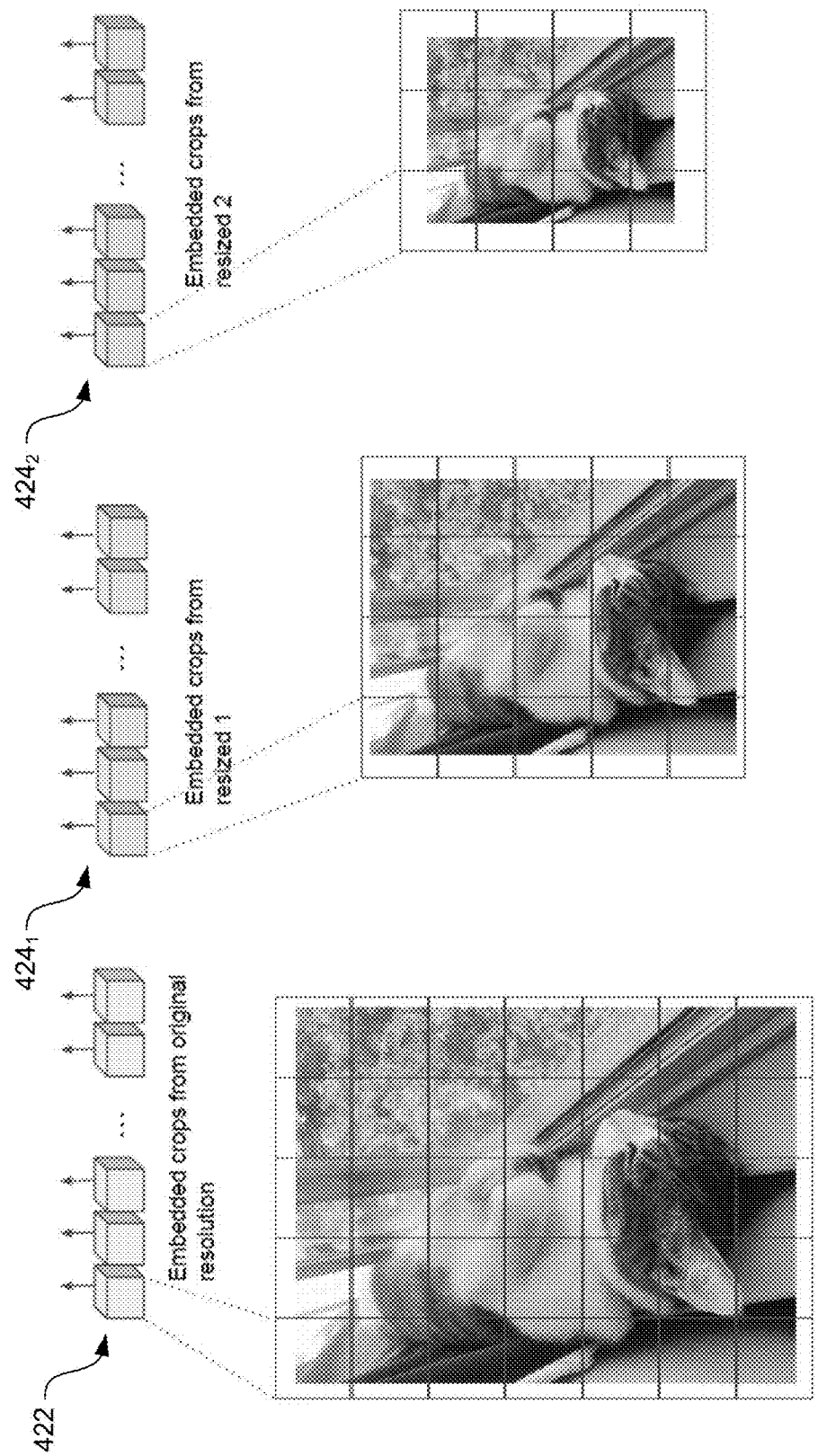

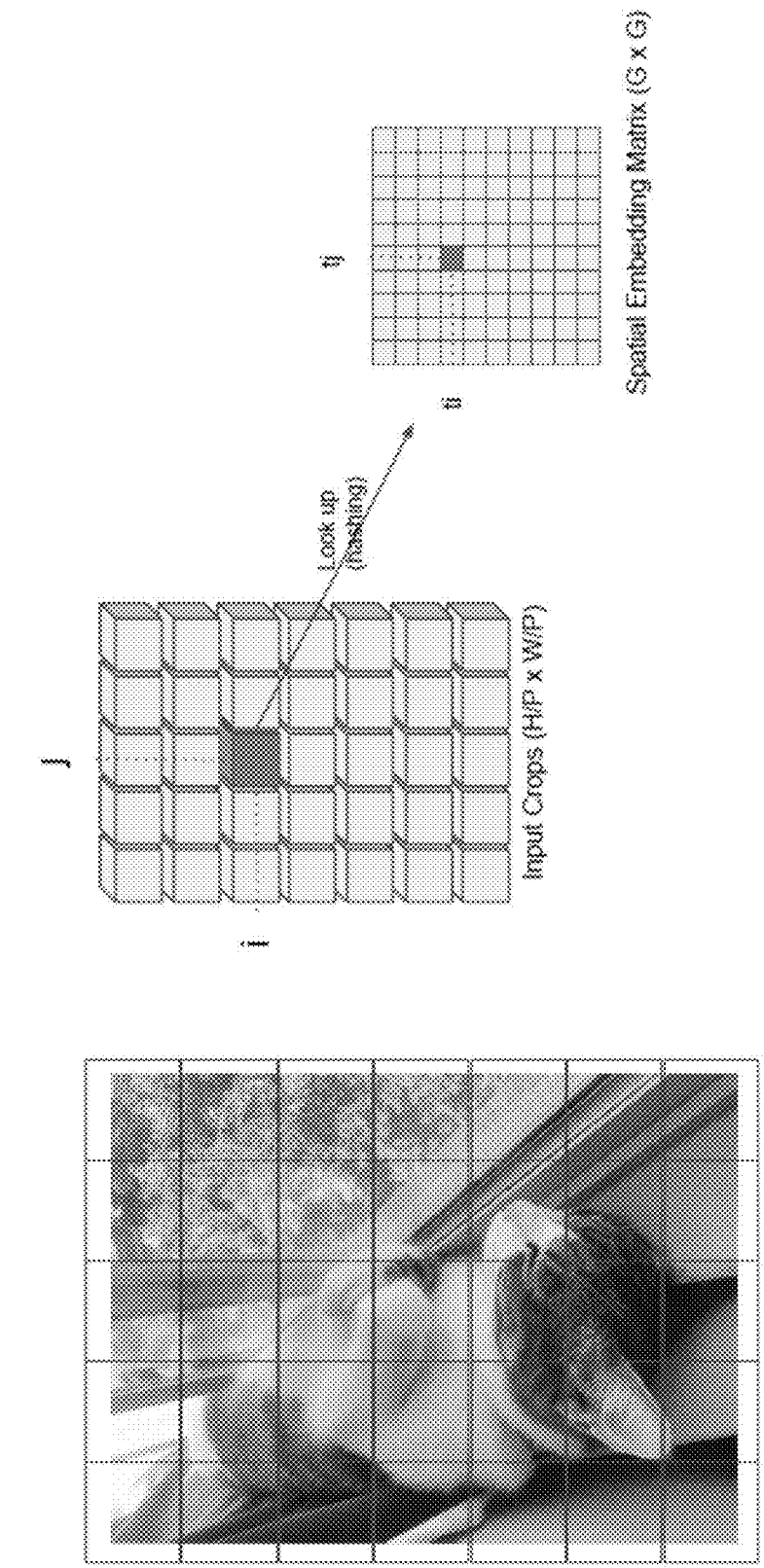

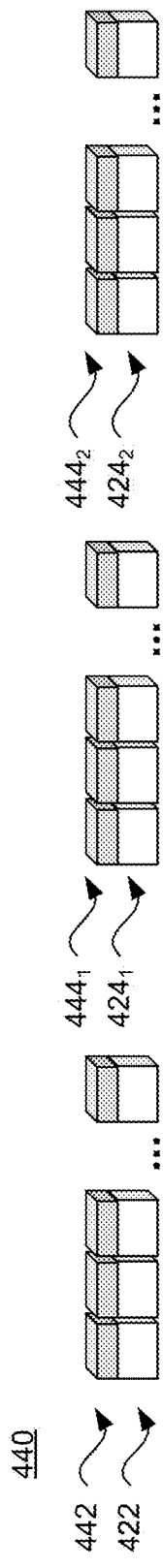
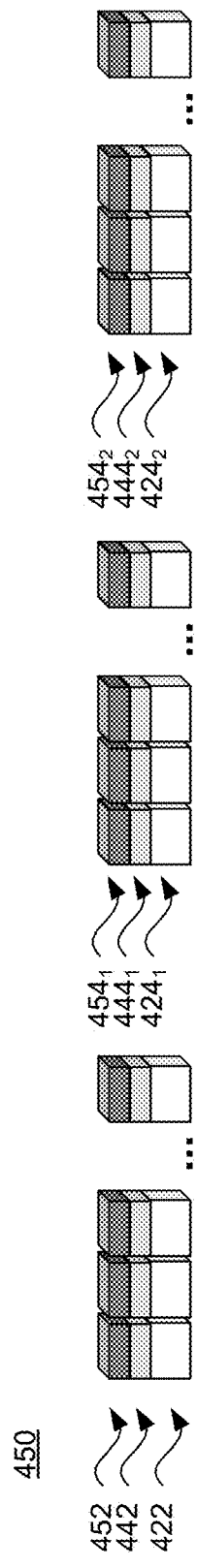
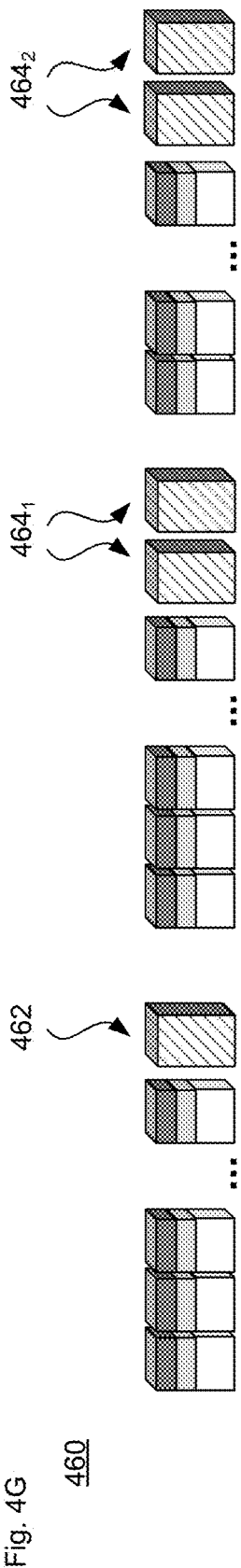

600

Multi-scale Composition

| Multi-scale Composition | SRCC | PLCC |
|---|---|---|
| (224) | 0.600 | 0.667 |
| (384) | 0.618 | 0.695 |
| (512) | 0.620 | 0.691 |
| (384, 224) | 0.620 | 0.707 |
| (512, 384, 224) | 0.629 | 0.718 |
| (full) | 0.640 | 0.721 |
| (full, 224) | 0.643 | 0.726 |
| (full, 384) | 0.642 | 0.730 |
| (full, 384, 224) | 0.646 | 0.739 |

Comparison of multiscale representation on PaQ-2-PiQ

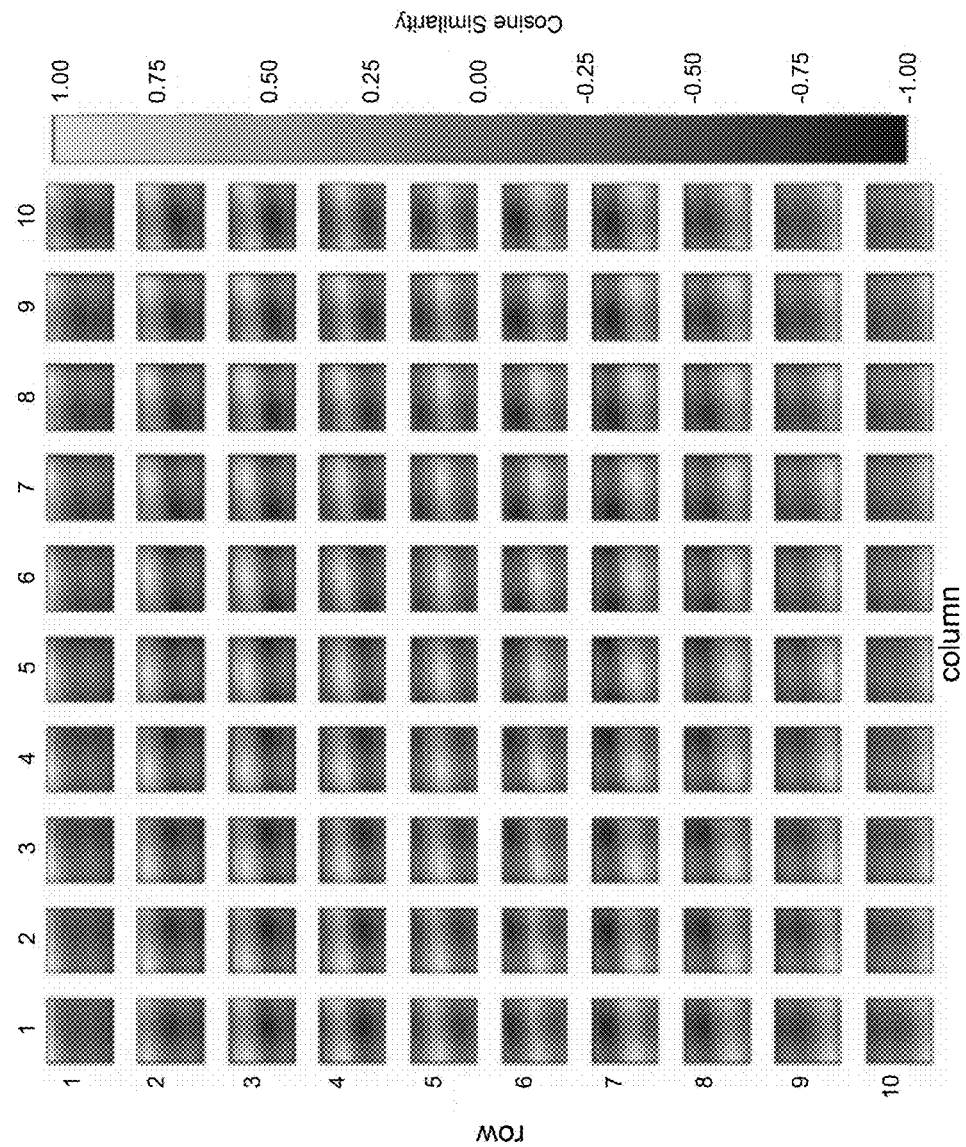
Fig. 7A 700 (G = 10)

710
(G = 5)

720
(G = 15)

830

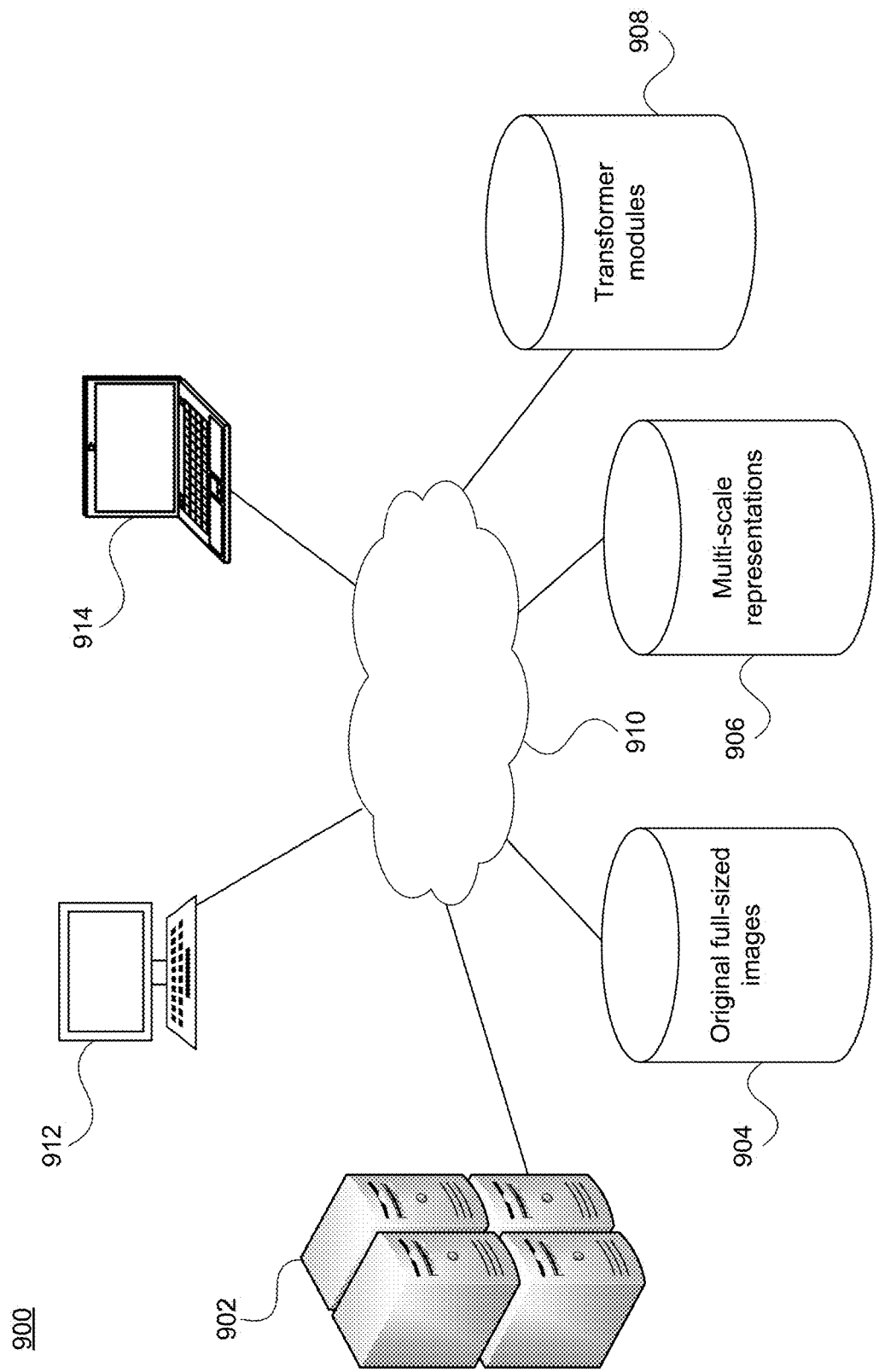

1000

MULTI-SCALE TRANSFORMER FOR IMAGE ANALYSIS

CROSS-REFERENCE TO RELATED APPLICATIONS

This application is a continuation of U.S. application Ser. No. 17/787,699, filed Jun. 21, 2022, which is a national phase entry under 35 U.S.C. § 371 of International Application No. PCT/US2021/040111, filed Jul. 1, 2021, published in English, the entire disclosures of which are incorporated herein by reference

BACKGROUND

Image analysis is used in many different types of applications. Some types of image analysis, such as image quality assessment (IQA), may quantify the perceptual quality of images. Other types of image analysis may be used to classify aspects of an image, such as objects appearing within the image. Such analysis can include analyzing imagery using convolutional neural networks (CNNs). However, such approaches may be constrained by fixed size input requirements for training a model with mini batches. Resizing or cropping to conform the image to a given size, with an associated aspect ratio, can impact image composition, introduce distortions or other artifacts, and thus change the quality of the image. Attempts to address such technical problems may raise other issues, such as necessitating large amounts of data storage, requiring resizing and smart grouping, or generally making training on a large dataset impractical.

BRIEF SUMMARY

Aspects of the technology employ a patch-based multi-scale Transformer, which can be used for IQA and other imaging applications. This approach, discussed in detail below, avoids constraints on image fixed input size and predicts the quality effectively on a native resolution image. It transforms the native resolution image into a multi-scale representation, enabling the Transformer's self-attention mechanism to capture information on both fine-grained detailed patches and coarse-grained global patches. Self-attention can attend to the whole input sequence and it can therefore effectively capture the image quality at different granularities. A hash-based 2D spatial embedding is employed that maps the patch positions to a fixed grid to effectively handle images with arbitrary aspect ratios and resolutions. Moreover, since the patch locations at each scale are hashed to the same grid, it aligns spatially close patches at different scales so that the Transformer model can leverage information across multiple scales. In addition to the spatial embedding, a separate scale embedding is further introduced to help the Transformer distinguish patches coming from different scales in the multiscale representation. Various implementations of the disclosed technology may address technical problems, such as less effective image analysis, which can result from the need to change the aspect ratio and/or resolutions of input images. The disclosed approaches may also enable better image analysis over a wider range of different images (i.e., not just images which already conform to a particular aspect ratio).

According to an aspect of the technology, a method for processing imagery is provided. The method comprises constructing, by one or more processors, a multi-scale representation of a native resolution image, the multi-scale representation including the native resolution image and a set of aspect ratio preserving resized variants; encoding, by the one or more processors, a corresponding spatial embedding for each patch associated with a respective region of either the native resolution image or one of the set of aspect ratio preserving resized variants, thereby forming a set of spatially encoded patches; applying, by the one or more processors, a set of scale embeddings to the set of spatially encoded patches to capture scale information associated with the native resolution image and the set of aspect ratio resized variants, thereby forming a set of input tokens; and performing, by the one or more processors according to a transformer encoder module, self-attention on the set of input tokens to create a final image representation.

In one example, the final image representation corresponds to a predicted quality score of the native resolution image. Constructing the multi-scale representation may include splitting each of the native resolution image and each aspect ratio preserving resized variant into fixed-size patches, wherein each patch represents a distinct region of either the native resolution image or one of the aspect ratio preserving resized variants.

In another example, encoding the corresponding spatial embedding includes hashing a patch position for each patch within a grid of learnable embeddings. In a further example, each aspect ratio preserving resized variant is formed so that an aspect ratio of that variant is sized according to a longer side of the native resolution image. The multi-scale representation may include the native resolution image with height H, width W and one or more channels C, and the set of aspect ratio preserving resized variants may be derived using a Gaussian kernel, wherein each channel represents a color component of the native resolution image.

In yet another example, to align the set of spatially encoded patches across scales, patch locations from all scales are mapped to a same grid. In a further example, the method also comprises, prior to self-attention, prepending a learnable classification token to the set of input tokens.

In another example, performing the self-attention on the set of input tokens includes performing multi-head self-attention on the set of input tokens, including: performing a first normalization on the set of input tokens to generate a set of first normalizations; performing a multi-head self-attention operation on the set of first normalizations; performing a second normalization on output of the multi-head self-attention operation to generate a second normalization; and performing a multi-layer perceptron process on the second normalization to create a final image representation. In this case, the second normalization may be performed on the output of the multi-head self-attention operation added to a residual connection from the set of input tokens. The final image representation may be obtained by adding input from the second normalization to output from the multi-layer perceptron process.

In yet another example, the method further comprises pretraining a transformer of the transformer encoder module on a selected image dataset. A size of the patches may be selected based on an average resolution across the native resolution image and the set of aspect ratio preserving resized variants. Here, the size of the patches may be further based on a size of a grid of learnable embeddings to which the patches are mapped.

According to another aspect of the technology, an image processing system comprises memory configured to store imagery and one or more processors operatively coupled to the memory. The one or more processors are configured to: construct a multi-scale representation of a native resolution image, the multi-scale representation including the native resolution image and a set of aspect ratio preserving resized variants; encode a corresponding spatial embedding for each patch associated with a respective region of either the native resolution image or one of the set of aspect ratio preserving resized variants, to form a set of spatially encoded patches; apply a set of scale embeddings to the set of spatially encoded patches to capture scale information associated with the native resolution image and the set of aspect ratio resized variants, to form a set of input tokens; and employ a transformer encoder module to perform self-attention on the set of input tokens to create a final image representation.

In one example, the processor(s) is further configured to store in the memory at least one of the final image representation, the native resolution image, or the set of aspect ratio preserving resized variants. The final image representation may correspond to a predicted quality score of the native resolution image. Construction of the multi-scale representation may include splitting each of the native resolution image and each aspect ratio preserving resized variant into fixed-size patches, wherein each patch represents a distinct region of either the native resolution image or one of the aspect ratio preserving resized variants. Encoding the corresponding spatial embedding may include hashing a patch position for each patch within a grid of learnable embeddings. The one or more processors may be further configured, prior to performing self-attention, to prepend a learnable classification token to the set of input tokens.

In a further example, performance of the self-attention on the set of input tokens includes performance of multi-head self-attention on the set of input tokens, including: performance of a first normalization on the set of input tokens to generate a set of first normalizations; performance of a multi-head self-attention operation on the set of first normalizations; performance of a second normalization on output of the multi-head self-attention operation to generate a second normalization; and performance of a multi-layer perceptron process on the second normalization to create a final image representation.

BRIEF DESCRIPTION OF THE DRAWINGS

FIGS. 4A-C illustrate multi-resolution image representations with maintained aspect ratios in accordance with aspects of the technology.

FIGS. 4D-G illustrate stages of model formation in accordance with aspects of the technology.

FIGS. 7A-C illustrate visualizations of learned HSE cosine similarity, in accordance with aspects of the technology.

DETAILED DESCRIPTION

Overview

A patch-based multi-scale Transformer is configured to construct a multi-scale image representation as input. This representation includes the native resolution image and a set of aspect ratio preserving (ARP) resized variants. As discussed further below, each image is split into fixed-size patches that are embedded by a patch encoding module. To capture the 2D structure of the image and handle images of varying aspect ratios, spatial embedding is encoded by hashing the patch position within a grid of learnable embeddings. Scale embedding is introduced to capture scale information. The Transformer encoder takes the input tokens and performs multi-head self-attention. The output may be predicted by adding a classification token to the sequence to represent the whole multi-scale input and use the corresponding Transformer output as the final representation.

Although the specification is described primarily with reference to image quality analysis (IQA), it will be appreciated that the disclosed technology is not limited to such an application but has wide applicability. By way of example, applications for which the technology can be used include IQA, image classification, image representation learning where tasks need to learn a representation of the image, and multi-modality learning (both text and image). In implementations where the patch-based multi-scale Transformer is trained to predict quality scores, the predicted quality scores can be further utilized in applications like image ranking, image recommendations, and bad image filtering. The technology is also applicable on subtasks in IQA, such as estimating some technical attributes (e.g., brightness, contrast, compression rate) of the image. Image classification with the approaches discussed herein can involve, e.g., general object classification tasks, as well as classification in biology or medicine where images should not be resized.

By being able to process images at their original aspect ratio, the Transformer described herein can achieve superior results (e.g., measured by a metric relating to the accuracy of transformer outputs) on a wide range of image analysis tasks when compared to existing systems.

Figure 1:
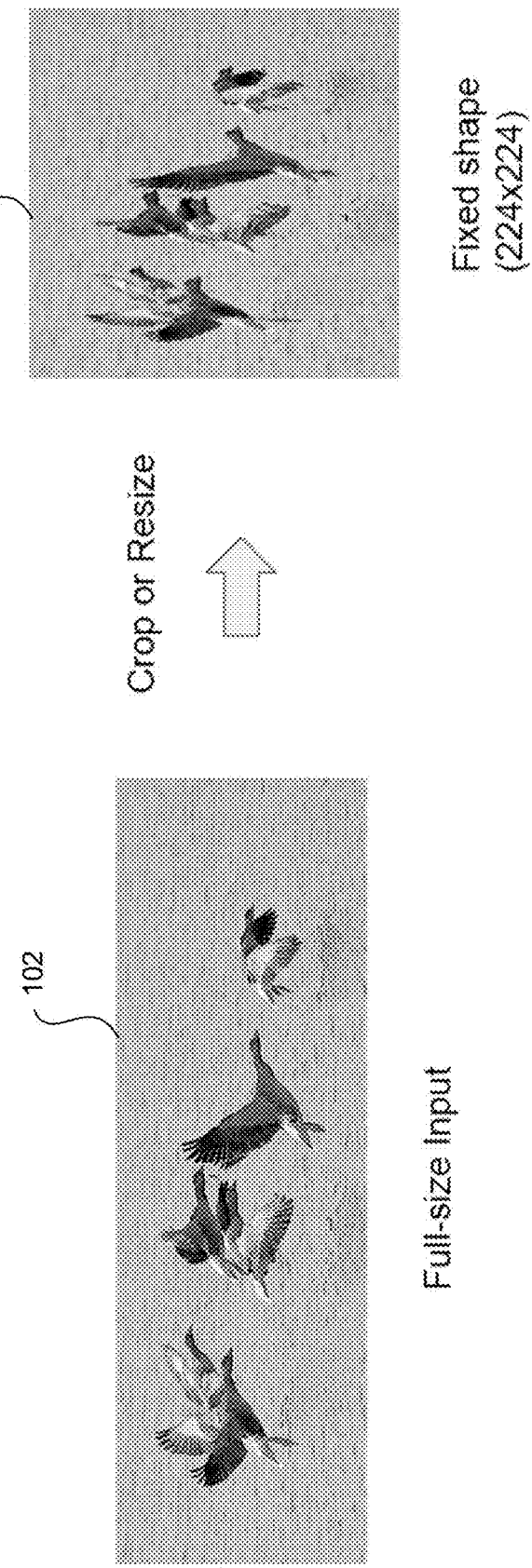
FIG. 1 illustrates an example CNN-based model using cropped or resized images.
Figure 2:
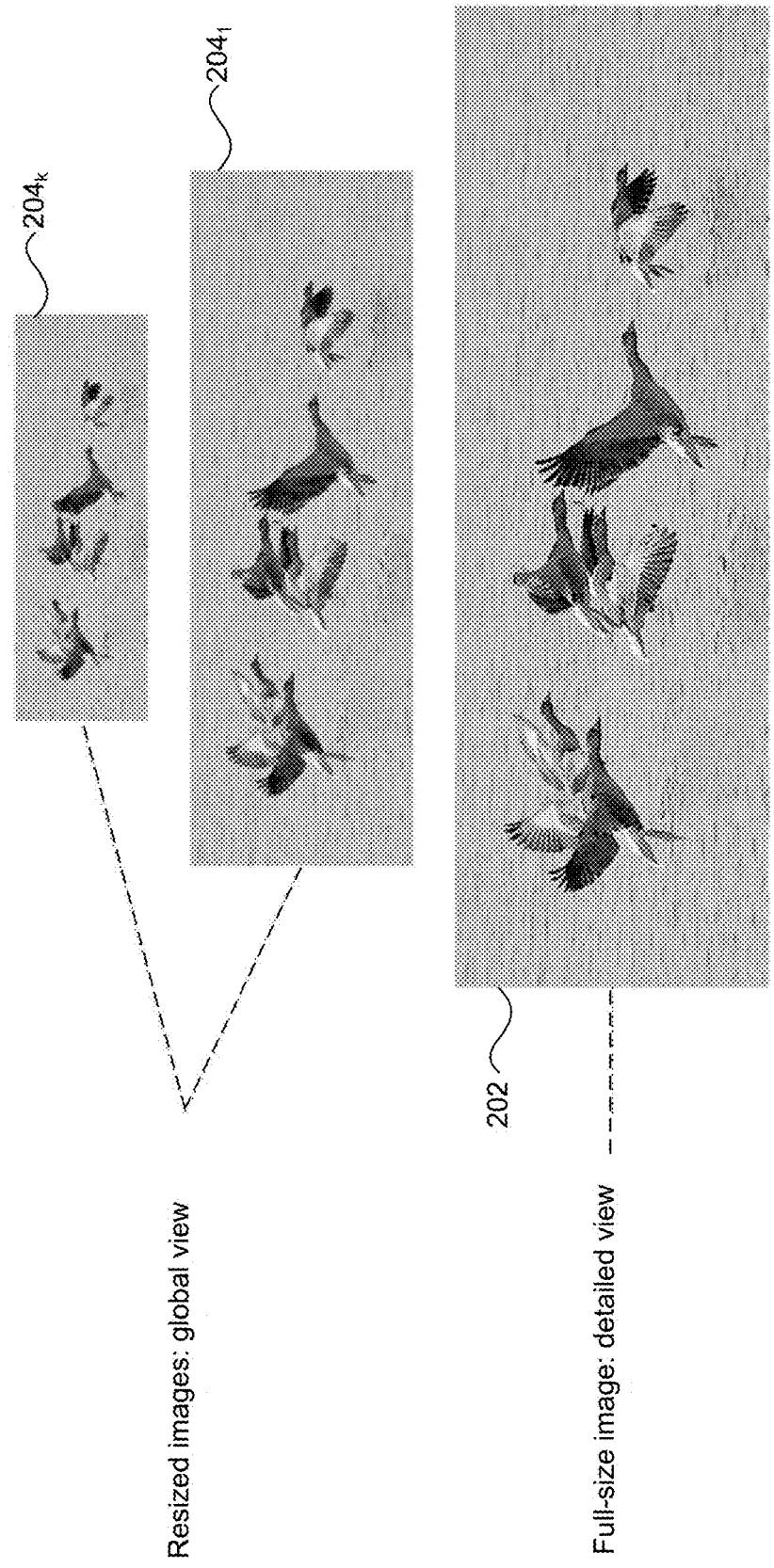
FIG. 2 illustrates an example multi-scale image representation in accordance with aspects of the technology.

FIG. 1 illustrates an example approach 100, in which a CNN-based model is used for image quality assessment. As shown, in a CNN-based model, full-size input image 102 need to be resized or cropped to a fixed shape 104 for batch training. However, such preprocessing can alter the image aspect ratio and/or composition, which can adversely affect image quality. In contrast, as shown in view 200 of FIG. 2, the patch-based multi-scale Transformer approach can process the full-size image 202 as a detailed view and extract multi-scale features from a set of resized images $204_1, \ldots, 204_k$.

Overall Architecture

Figure 3:
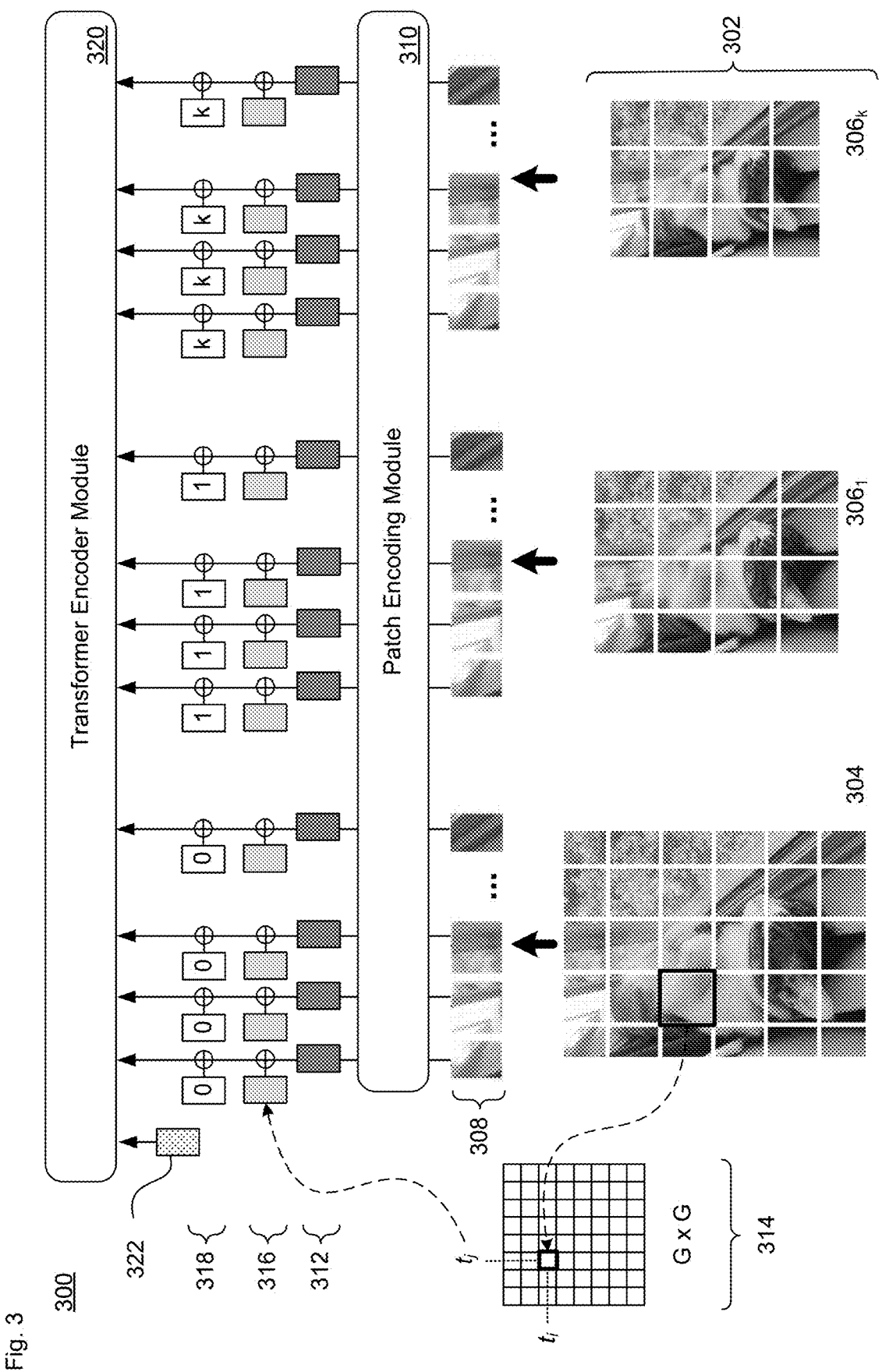
FIG. 3 illustrates an example model overview of a multi-scale Transformer for image quality assessment in accordance with aspects of the technology.

FIG. 3 provides an illustration 300 of a model overview of a multi-scale Transformer in accordance with aspects of the technology, which may be used, for instance, for image quality assessment. As shown at 302, a multi-scale image representation is constructed as input to the Transformer encoder. This representation includes the native resolution image (304) and its ARP resized variants ($306_1, \ldots, 306_k$). In this example, each image 304 and 306 is split into fixed-size patches 308, which are embedded by a patch encoding module 310 to form a multi-scale patch embedding set 312. To capture the 2D structure of the image and handle images of varying aspect ratios, the spatial embedding is encoded by hashing the patch position (i, j) to ($t_i$, $t_j$) within a grid of learnable embeddings, as illustrated in the G×G array 314, with the resultant set of embeddings 316 shown above the multi-scale patch embedding set 312. A set of scale embeddings 318 is introduced to capture scale information. Transformer encoder module 320 takes the resultant set of input tokens and performs multi-head self-attention. To obtain the output for the image (e.g., a prediction of the image quality or a classification for the image), a classification token [CLS] 322 may be applied to the sequence to represent the whole multi-scale input. The corresponding Transformer output may be used as the final representation associated with the native resolution image, such as a quality score or classification (not shown). The various aspects of this model will be described in detail below.

More particularly, a multi-scale representation of the input image is created that contains the native resolution image and its ARP resized variants. As shown in the example 400 of FIG. 4A, there are two resized variants, although there may be three, four or more resized variants. The resized variants may be formed so that the aspect ratio is sized according to the longer side of the original image (i.e., fix the longer side to L_i as shown).

Figure 4B:
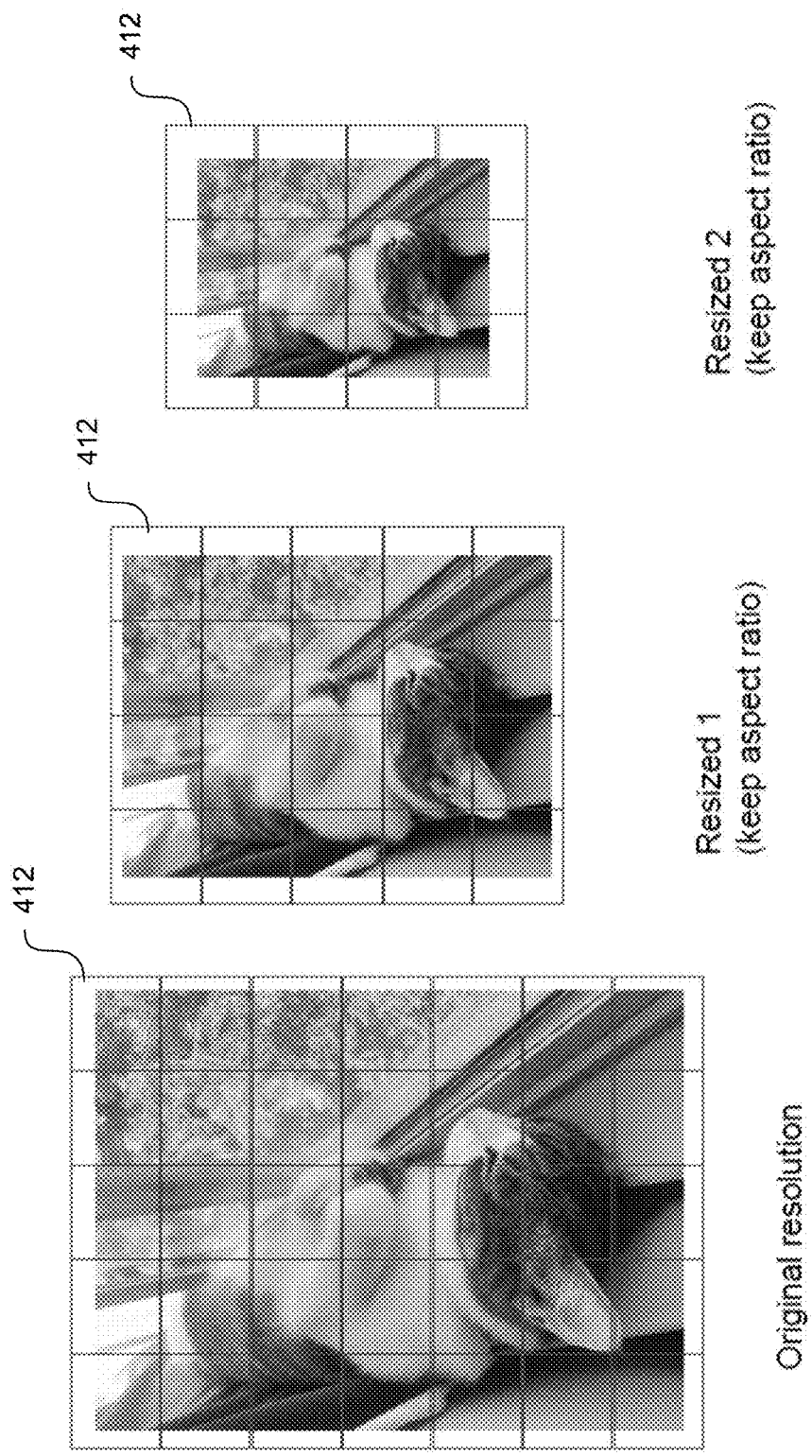

The images at different scales are partitioned into fixed-size patches and fed into the model. FIG. 4B illustrates a view 410, in which patches 412 are shown as distinct boxes in along each image. Since patches come from images of varying resolutions, the system effectively encodes the multi-aspect-ratio multi-scale input into a sequence of tokens (boxes 312, 316 and 318 in FIG. 3), capturing the pixel, spatial, and scale information. The patch encoding module (310 in FIG. 3) encodes patches extracted from the multi-scale representation. A hash-based spatial embedding module encodes the 2D spatial position for each patch. And a learnable scale embedding encodes different scale. After encoding the multi-scale input into a sequence of tokens, the system may prepend an extra learnable "classification token" [CLS] (see 322 of FIG. 3). In this case, the CLS token state at the output of the Transformer encoder serves as the final image representation. A fully connected layer may be added to predict the image quality score. The tokens are vectors of a fixed size. The final input token includes scale, spatial information and patch information.

Multi-Scale Patch Embedding

Image quality may be impacted by both the local details and global composition. In order to capture both the global and local information, the technology models the input image with a multi-scale representation. Patches from different scales enable the Transformer to aggregate information across multiple scales and spatial locations. In one example, the multi-scale input is composed of the full-size image with height H, width W, channel C, and a sequence of ARP resized images from the full-size image using the Gaussian kernel. Each channel represents one color component of the image. For instance, when the input image is in RGB format it therefore has 3 channels. A grayscale image only has 1 channel and a RGBA image has 4 channels (RGB+alpha). For a RGB image, each pixel is represented by three [0, 255] values for pixel intensities, each representing respective the R-channel, G-channel, B-channel value. Therefore, a RGB image of height H and width W can be represented by a matrix of shape [H, W, 3].

Here, the resized images have height $h_k$, width $w_k$, and channel C, where k=1, ..., K, and in which K is total the number of resized variants for each input. To align resized images for a consistent global view, the longer side length is fixed to $L_k$ for each resized variant. A resizing factor, $\alpha_k$, may be defined as:

$$\alpha_k = L_k/\max(H, W), \text{ in which } h_k = \alpha_k H, w_k = \alpha_k W \quad (1)$$

According to one scenario, there may be no constraints on how the resized variants are composed, so long as the lengths are ordered consistently during training and testing.

FIG. 4C illustrates a view 420, which illustrates embedded "crops" (patches) 422 from the original resolution image and crops $424_1$ and $424_2$ from the resized images (K=2). These form the patch pixel embedding portion of the model. The crops are input to the patch encoding module (310 in FIG. 3) once pre-processing is complete.

Square patches (crops) with size P are extracted from each image in the multi-scale representation. By way of example, the patch size P may be 16×16, 32×32, 64×64 or a larger or smaller size. For images having a width or height that are not multiples of P, the image may be padded with zeros accordingly. Each patch is encoded into a D-dimension embedding by the patch encoder module. D here is the latent token size used in the Transformer. While the patches could be encoded with a linear projection, in one scenario a 5-layer ResNet type convolutional neural network may be employed with a fully connected layer of size D as the patch encoder module to learn a better representation for the input patch. Encoding the patch with a few convolution layers (e.g., up to 5 layers) may perform better than linear projection when pre-training on an ImageNet Large Scale Visual Recognition Challenge (ILSVRC) such as ILSVRC-2012 ImageNet. Since the patch encoding module is lightweight and shared across all the input patches whose size P is small, it only adds a small amount of parameters. For instance, the following table shows an example of the total number of parameters for models with different patch encoding modules using an AVA dataset. Here, for a 32×32 patch size, 2-layer convolution adds 1 million (1M) parameters relative to linear projection, while 5-layer ResNet adds 5 million (5M) parameters. Spearman rank ordered correlation (SRCC), Pearson linear correlation (PLCC), The 2-layer convolution may, for instance, use the root of ResNet (a 7×7 convolution followed by a 3×3 convolution). For the 5-layer ResNet, a residual block is stacked on top of the 2-layer (simple) convolution.

TABLE 0 comparison of different patch encoding modules on the AVA dataset

| | # Parameters | SRCC | PLCC |
| --- | --- | --- | --- |
| Linear Projection | 22M | 0.703 | 0.716 |
| 2-layer convolution | 23M | 0.717 | 0.731 |
| 5-layer ResNet | 27M | 0.726 | 0.738 |

The sequence of patch embeddings output from the patch encoder module are concatenated together to form a multi-scale embedding sequence for the input image. The number of patches from the original image and the resized ones may be calculated as $N=HW=P^2$ and $n_k=h_k w_k/P^2$, respectively. Thus, the number of patches may be different for each image.

Since each input image has a different resolution and aspect ratio, H and W are different for each input and therefore N and $n_k$ are different. To get fixed-length input during training, the encoded patch tokens may be zero-padded or cut to the same length. An input mask may be attached to indicate the effective input, which will be used in the Transformer to perform masked self-attention. It is noted that the padding operation will not change the input because the padding tokens are ignored in the multi-head attention by masking them.

As noted above, the longer length side is fixed to $L_k$ for each resized variant. Therefore $n_k \le L_k^2/P^2 = m_k$, and the system can safely pad to $m_k$. For the native resolution image, the system may simply pad or cut the sequence to a fixed length l. The padding is not necessary during single-input evaluation because the sequence length can be arbitrary.

Hash-Based 2D Spatial Embedding

Spatial positional embedding is beneficial to inject awareness of the 2D image structure in the 1D sequence input. Fixed-length positional embedding assigns an embedding for every input location; however, this fails for variable input resolutions where the number of patches are different and therefore each patch in the sequence may come from an arbitrary location in the image. In addition, positional embedding models that position independently cannot align the spatially close patches from different scales. In view of this, aspects of the technology are configured to meet the following requirements. First, effectively encode patch spatial information under different aspect ratios and input resolutions. Second, spatially close patches at different scales should have close spatial embeddings. And third, the embedding should be efficient and easy to implement, and be non-intrusive to the Transformer attention. Here, non-intrusive means that the system does not need to change the Transformer attention implementation, in contrast to a relative positional embedding approach that would require changes in the Transformer attention part.

Given the above, a hash-based 2D spatial embedding (HSE) is provided, in which the patch locating at row i, column j is hashed to the corresponding element in a G×G grid (see 314 in FIG. 3). View 430 in FIG. 4D illustrates how the input crops for the patches are hashed or otherwise mapped to the corresponding elements in the G×G grid. By way of example, a lookup table could be used to implement the hashing.

Each element in the grid is a D-dimensional embedding. HSE is defined by a learnable matrix $T \in \mathbb{R}^{G \times G \times D}$. Suppose the input resolution is H×W. The input image will be partitioned into $$\frac{H}{P} \times \frac{W}{P}$$

patches. For the patch at position (i, j), its spatial embedding is defined by the element at position $(t_i, t_j)$ in T where:

$$t_i = \frac{i \times G}{H/P}, t_j = \frac{j \times G}{W/P} \quad (2)$$

The D-dimensional spatial embedding $T_{t_i, t_j}$ is added to the patch embedding element-wisely as shown in FIG. 3. View 440 of FIG. 4E shows the spatial embedding being applied with the patch pixel embedding for the crops from each resolution, 442, $444_1$ and $444_2$.

For fast lookup, the system may simply round $(t_i, t_j)$ to the nearest integers. HSE does not require any changes in the Transformer attention module. Moreover, both the computation of $t_i$ and $t_j$ and the lookup are lightweight and easy to implement without an unnecessary amount of computing resources.

To align patches across scales, patch locations from all scales are mapped to the same grid T. As a result, patches located closely in the image but from different scales are mapped to spatially close embeddings in T, since i and H as well as j and W change proportionally to the resizing factor α. This achieves spatial alignment across different images from the multi-scale representation.

There is a trade-off between expressiveness and trainability with the choice hash grid size G. Small G (e.g., 4 or less) may result in too much collision between patches, which makes the model unable to distinguish spatially close patches. Large G (e.g., 100 or more) could consume significant memory resources and may need more diverse resolutions to train. Large G means the hashing is sparser and therefore needs more diverse resolutions to train, otherwise some positions may not have enough data to learn good representations. With a learnable T, a suitable rule of thumb would be to let grid size times the number of patches P roughly equal the average resolution, so that G×G×P× P=H×W. With an average resolution across different datasets being around 450×500 and a patch size of 32, the grid size may be in the range of 10 to 15. In one scenario, according to one IQA setting where rough positional information is sufficient, it has been found that once G is large enough, changing G only results in small performance differences. Thus, in one example G may be between 5-15, e.g., 10, although larger or smaller G values can be employed.

Scale Embedding

Since the same hashing matrix may be reused for all images, HSE does not make a distinction between patches from different scales. Therefore, an additional scale embedding (SCE) is introduced to help the model effectively distinguish information coming from different scales and better utilize information across scales. In other words, SCE marks which input scale the patch is coming from in the multi-scale representation. View 450 of FIG. 4F shows the scale embedding 452, $454_1$ and $454_2$ being applied with the spatial embedding and 442, $444_1$ and $444_2$ and the patch pixel embedding for the crops from each resolution, 442, $444_1$ and $444_2$. As noted above, to obtain fixed-length input during training, the encoded patch tokens may be zero-padded to the same length. This is shown in view 460 of FIG. 4G, with zero padding blocks 462, $464_1$ and $464_2$.

SCE is defined as a learnable scale embedding $Q \in \mathbb{R}^{(K+1) \times D}$ for the input image with K-scale resized variants. Following the spatial embedding, the first element $Q_0 \in \mathbb{R}^D$ is added element-wisely to all the D-dimensional patch embeddings from the native resolution image. $Q_k \in \mathbb{R}^D$; k=1, ..., K are also added element-wisely to all the patch embeddings from the resized image at scale k.

Pre-Training and Fine Tuning

In one example, the Transformer model is pre-trained on a large dataset, e.g., a dataset having a million or more images such as ImageNet, and fine-tuned on the downstream tasks. During the pre-training, the system may keep random cropping as an augmentation to generate the images of different sizes. However, instead of doing square resizing, the system may skip resizing to prime the model for inputs with different resolutions and aspect ratios. Augmentations such as RandAugment and mixup may be used in pre-training. For instance, with a pool of augmentation operations, RandAugment randomly chooses N from the pool and applies it sequentially with magnitude M (N, M are configurable). Mixup is a data augmentation technique that generates a weighted combination of random image pairs from the training data. Other suitable pre-training datasets include ImageNet21k, JFT-300M and Open Image.

When fine-tuning on IQA tasks, the system need not resize or crop the input image to preserve the image composition and aspect ratio, so that the model has an unmodified input image at the start of the process. In one scenario, the only augmentation used in finetuning is random horizontal flipping. Here, for each training image, the system may randomly flip it horizontally with a probability p, where p may be 0.5 (or more or less). For evaluation, the method can be directly applied on the original image without aggregating multiple augmentations (e.g., multi-crops sampling).

When fine-tuning on the IQA datasets, which may comprise images labelled with a corresponding IQA measure/score, regression losses such as L1 loss for single mean opinion score (MOS) and Earth Mover Distance (EMD) loss may be used to predict the quality score distribution:

$$EMD(p, \hat{p}) = \left(\frac{1}{N}\sum_{M=1}^{N}\left|CDF_p(m) - CDF_{\hat{p}}(m)\right|^r\right)^{\frac{1}{r}} \quad (3)$$

where p is the normalized score distribution and $CDF_p(m)$ is the cumulative distribution function as $\Sigma_{i=1}^{m} p_i$. The EMD loss penalizes distribution distance between rating and prediction. Here, r is a hyper-parameter to select the r-norm distribution distance. By way of example, r may be set to 2 to penalize the Euclidean distance between the CDFs.

When the system is trained to perform other image analysis tasks, other training datasets and loss functions (or objective functions) may be used. For example, for classification tasks, the Transformer may be trained using classification datasets that comprise a number of image inputs and corresponding labels that denote a particular class for the image. A suitable loss function such as a cross-entropy loss may be utilized to train the Transformer in such scenarios. It will be appreciated that the Transformer may be used for other image analysis tasks, as described previously, and any suitable dataset and/or loss function may be used for training the transformer to perform the image analysis task(s).

The Transformer Encoder

Figure 5A:
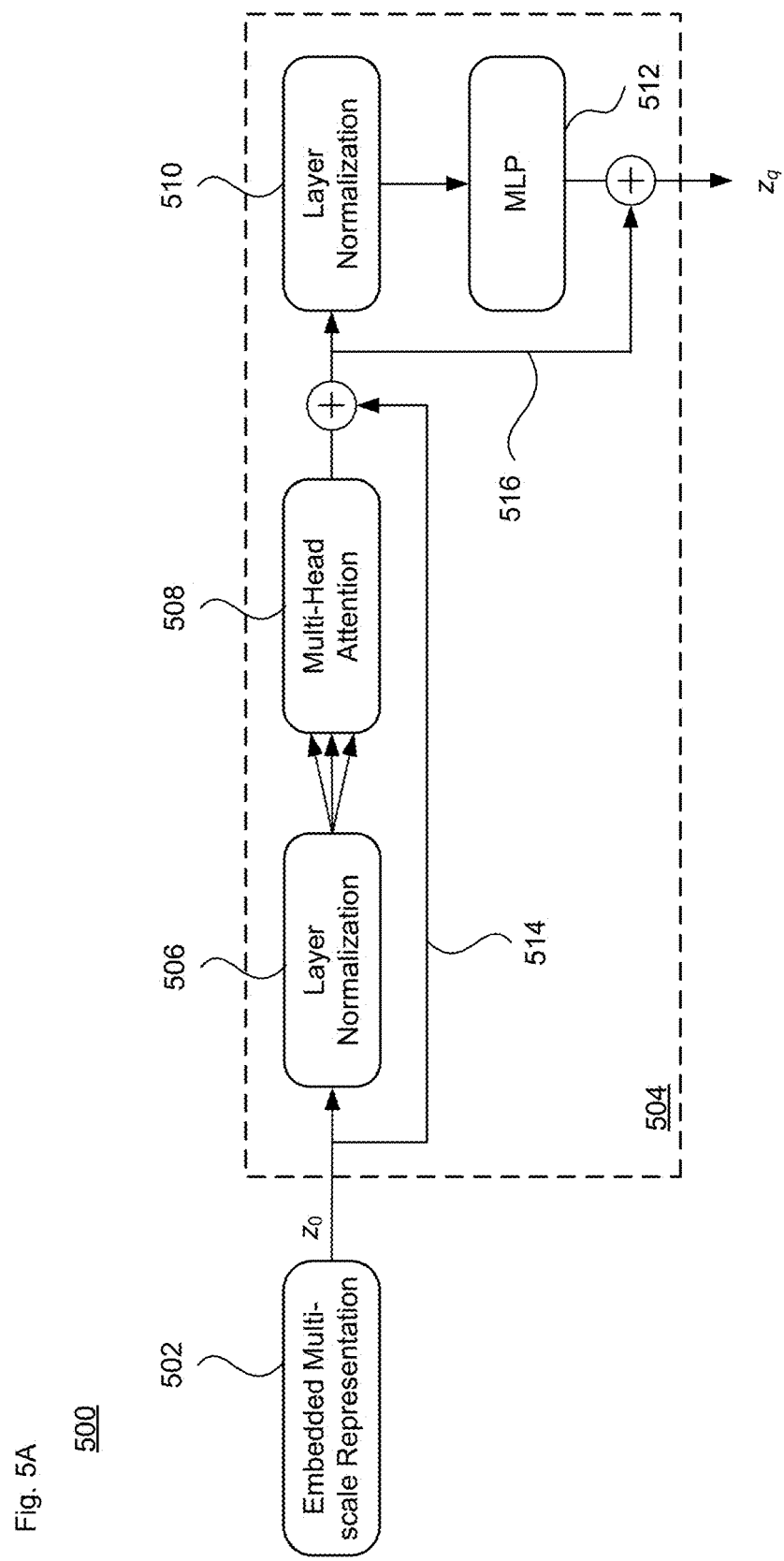
FIG. 5A illustrates an example Transformer encoder in accordance with aspects of the technology.

An example Transformer encoder 500 is shown in FIG. 5A. As illustrated, an embedded multi-scale representation 502 is input to transform encoder block 504. The transform encoder block 504 comprises the following layers: a first layer normalization 506, a multi-head self-attention (MSA) layer 508, a second layer normalization 510, and a multi-layer perceptron (MLP) layer 512. Residual connections are added in between the layers, as shown by arrows 514 and 516.

The multi-scale patches are encoded as $x_k^n$, where k=0 . . . K is the scale index and n is the patch index in the scale.

k=0 represents the full-size image. K is a tunable parameter. The hash-based 2D spatial embedding (HSE) and the scale embedding (SCE) are added to the patch embeddings, forming the multi-scale representation input. A learnable [class] token embedding may be prepended to the sequence of embedded tokens ($x_{class}$). The Transformer encoder can be formulated as:

$$E_p = [x_0^1; \ldots x_0^l; x_1^1; \ldots; x_1^{m_1}; \ldots; x_K^1; \ldots; x_K^{m_K}] \quad (4)$$

$$z_0 = [x_{class}; E_p + E_{HSE} + E_{SCE}] \quad (5)$$

$$z_q' = MSA(LN(z_{q-1})) + z_{q-1}, q=1 \ldots L \quad (6)$$

$$z_q = MLP(LN(z_q')) + z_q', q=1 \ldots L \quad (7)$$

$$y = LN(z_L^0) \quad (8)$$

$E_p$ is the patch embedding. $E_{HSE}$ and $E_{SCE}$ are the spatial embedding and scale embedding respectively. l is the number of patches from original resolution. $m_1 \ldots m_k$ are the number of patches from resized variants. $z_0$ is the input to the Transformer encoder. $z_q$ is the output of each Transformer layer and L is the total number of Transformer layers.

Using a large l in the fine-tuning can improve the model performance. Since larger resolution images have more patches than low resolution ones, when l is too small, some larger images might be cutoff, thus the model performance can degrade. By way of example, l may be chosen to be 128, 256 or 512, or more or less.

Figure 5B:
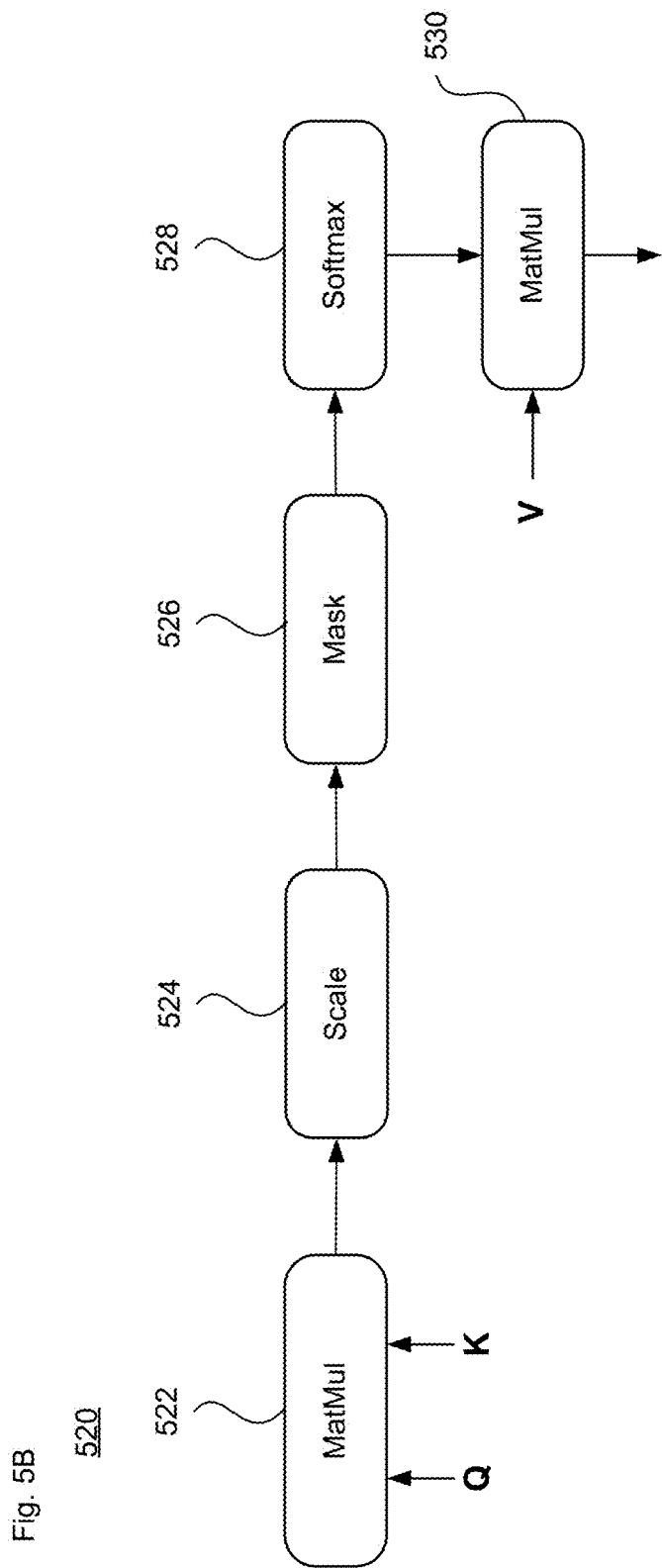
FIG. 5B diagrammatically illustrates features of multi-head self-attention in accordance with aspects of the technology.

Self-attention and its multi-head version, multi-head self-attention (MSA), are discussed in relation to example 520 of FIG. 5B. Suppose the input sequence is represented by $z \in \mathbb{R}^{N \times D}$, vectors Q, K, and V are its query (Q), key (K), and value (V) representations, respectively. Q, K and V are generated by projecting the input sequence with a learnable matrix $U_q$, $U_k$, $U_v \in \mathbb{R}^{D \times D_h}$, respectively. $D_h$ is the inner dimension for Q, K, V. A weighted sum is then computed over V using attention weights $A \in \mathbb{R}^{N \times N}$ which are pair-wise similarities between Q and K.

$$Q = zU_q, K = zU_k, V = zU_v \quad (9)$$

$$A = \text{softmax}(QK^T/\sqrt{D_h}) \quad (10)$$

$$SA(z) = AV \quad (11)$$

MSA is an extension of self-attention where s self-attention operations (heads) are conducted in parallel. The outputs from all heads are concatenated together and then projected to the final output with a learnable matrix $U_m \in \mathbb{R}^{s \cdot D_h \times D}$. $D_h$ may be set to D/s to keep computation and number of parameters constant for each s. This leads to:

$$MSA(z) = [SA_1(z); \ldots; SA_s(z)]U_M \quad (12)$$

In batch training, the input mask is used to indicate the effective input and to ignore padding tokens. As shown at block 526 in FIG. 5B, the mask is added on attention weights before the softmax function is performed at block 528. By setting the corresponding elements to −inf (negative infinity) before the softmax step in Equation 10, the attention weights on invalid positions are close to zero. In one example, attention weights are averaged across all heads and then recursively multiplied, accounting for the mixing of attention across tokens through all layers. Thus, FIG. 5B represents equation (10) and (11). MatMul block 522 stands for matrix multiplication ($QK^T$ in (equation 10)). Scale at block 524 indicates scaling by $1/\sqrt{D_h}$ in (equation 10). The mask operation at block 526 is setting the elements that need to be ignored to −inf (see equation 14 below). Softmax block 528 normalizes the output of $(QK^T/\sqrt{D_h}+mask)$ to a probability distribution. The final MatMul block 530 is the AV multiplication in equation 11).

The attention mask may be constructed as $M \in \mathbb{R}^{N \times N}$, where:

$$M_{i,j} = \begin{cases} 0 & \text{if attention } pos_i \to pos_j \text{ valid} \\ -inf & \text{if attention } pos_i \to pos_j \text{ invalid} \end{cases} \quad (13)$$

Then the masked self-attention weight matrix can be calculated as:

$$A_m = \text{softmax}((QK^T+M)/\sqrt{D_h}) \quad (14)$$

EXAMPLE IMPLEMENTATION

In one example, the multi-scale representation is constructed as the native resolution image and two ARP resized images are employed, with $L_1=224$ and $L_2$. As a result, the number of scales is K=3. The patch size P=32. The dimensions for Transformer input tokens are D=384, which is also the dimension for pixel patch embedding, HSE and SCE. The grid size of HSE is set to G=10. A Transformer with lightweight parameters (e.g., 384 hidden size, 14 layers, 1152 MLP size and 6 heads) is employed to make the model size comparable to ResNet-50. The final model has approximately 27 million total parameters.

In this example, the MST-IQA models are trained on ImageNet for 300 epochs, using Adam with $\beta_1=0.9$; $\beta_2=0.999$, a batch size of 4096, 0.1 weight decay and cosine learning rate decay from 0.001. The maximum number of patches is set from full-size image 1 to 512 in training. For fine-tuning, SGD is used with momentum and cosine learning rate decay from 0.0002, 0.002, 0.0001, 0.12 for 10, 30, 30, 20 epochs on PaQ-2-PiQ, KonIQ-10k, SPAQ, and AVA, respectively. Batch size is set to 512 for AVA, 96 for KonIQ-10k, and 128 for the rest. For AVA, we use the EMD loss with r=2. For other datasets, L1 is used for the loss.

Figure 6:
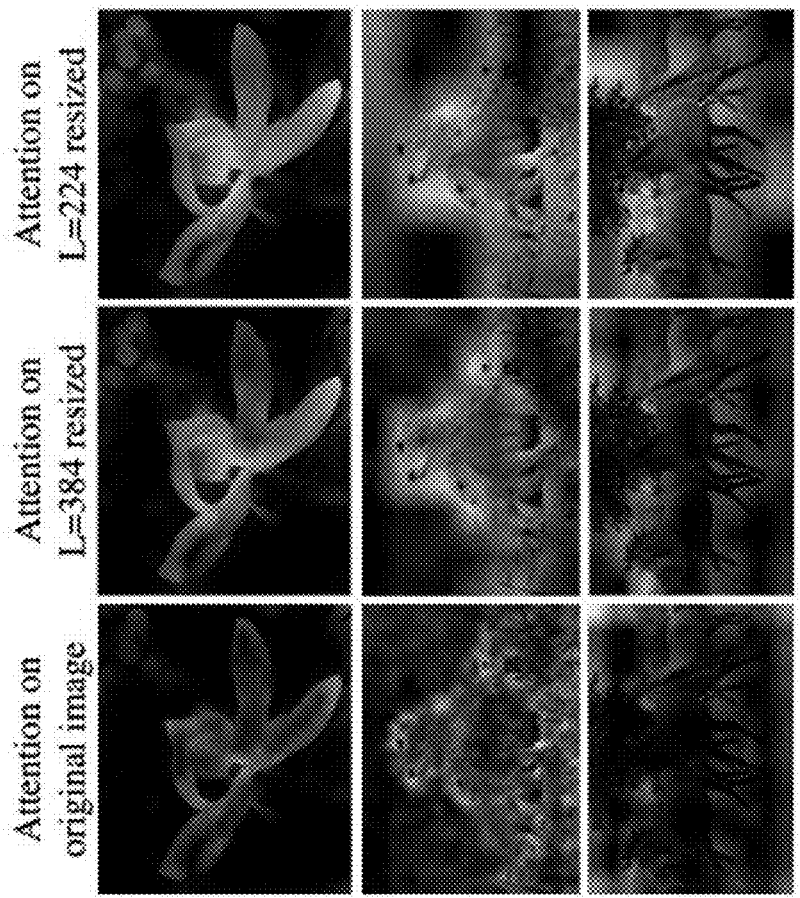
FIG. 6 illustrates an example of attention on an original and resized images for multi-scale composition in accordance with aspects of the technology.

The models may be trained on one or more tensor processing units (TPUs). All the results may be averaged across 10 runs. SRCC, PLCC, and the corresponding standard deviation (std) are reported. Table 1 below shows results on PaQ-2-PiQ full-size validation and test sets, and view 600 of FIG. 6 graphically illustrates the attention on the original and resized images. The last line in the table of view 600 (full, 384, 224) shows the test set results of Table 1. The images on the right side of the figure are visualizations of attention from the output tokens to the multi-scale representation (original resolution image and two ARP resized variants). The images here are resized to fit the grid, and the model inputs are 3 different resolutions. The model is focusing on details in higher resolution image and on global area in lower resolution ones. This shows that the model learns to capture image quality at different granularities. Table 2 shows results on the KonIQ-10k dataset. Table 3 shows results on the SPAQ dataset. And table 4 shows results on the AVA dataset.

TABLE 1

PaQ-2-PiQ full-size validation and test sets

| Validation Set | | Test Set | |
|---|---|---|---|
| SRCC | PLCC | SRCC | PLCC |
| 0.566 | 0.661 | 0.646 | 0.739 |

TABLE 2

Results on KonIQ-10k dataset

| SRCC | PLCC |
|---|---|
| 0.909 | 0.923 |

TABLE 3

Results on SPAQ dataset

| SRCC | PLCC |
|---|---|
| 0.917 | 0.921 |

TABLE 4

Results on AVA dataset

| Classification Accuracy | Mean Squared Error | SRCC | PLCC |
|---|---|---|---|
| 0.815 | 0.242 | 0.726 | 0.738 |

Evaluating the effectiveness of hash-based spatial embedding (HSE) and scale embedding (SCE) can be done using ablations. Table 5 below shows an ablation study for spatial embeddings on AVA.

TABLE 5

Ablation study results for spatial embeddings on AVA

| Spatial Embedding | SRCC | PLCC |
|---|---|---|
| w/o embedding | 0.704 | 0.716 |
| Fixed-length (no HSE) | 0.707 | 0.722 |
| HSE | 0.726 | 0.738 |

For "Fixed length (no HSE)", the input is considered as a fixed-length sequence and assign a learnable embedding for each position. As shown here, there is a large gap between adding and not adding ("w/o embedding") spatial embeddings. Even the fixed-length sequence is less satisfactory than HSE. This is because of two reasons. First, the inputs are of different aspect ratios. Thus, each patch in the sequence can come from a different location from the image. Fixed positional embedding fails to capture this change. And second, since each position is modeled independently, there is no cross-scale information, meaning that the model cannot locate spatially close patches from different scales in the multi-scale representation. Moreover, the fixed-length method is inflexible because fixed length spatial embedding cannot be easily applied to the large images with more patches. On the contrary, HSE is meaningful under all conditions.

Figure 7B:
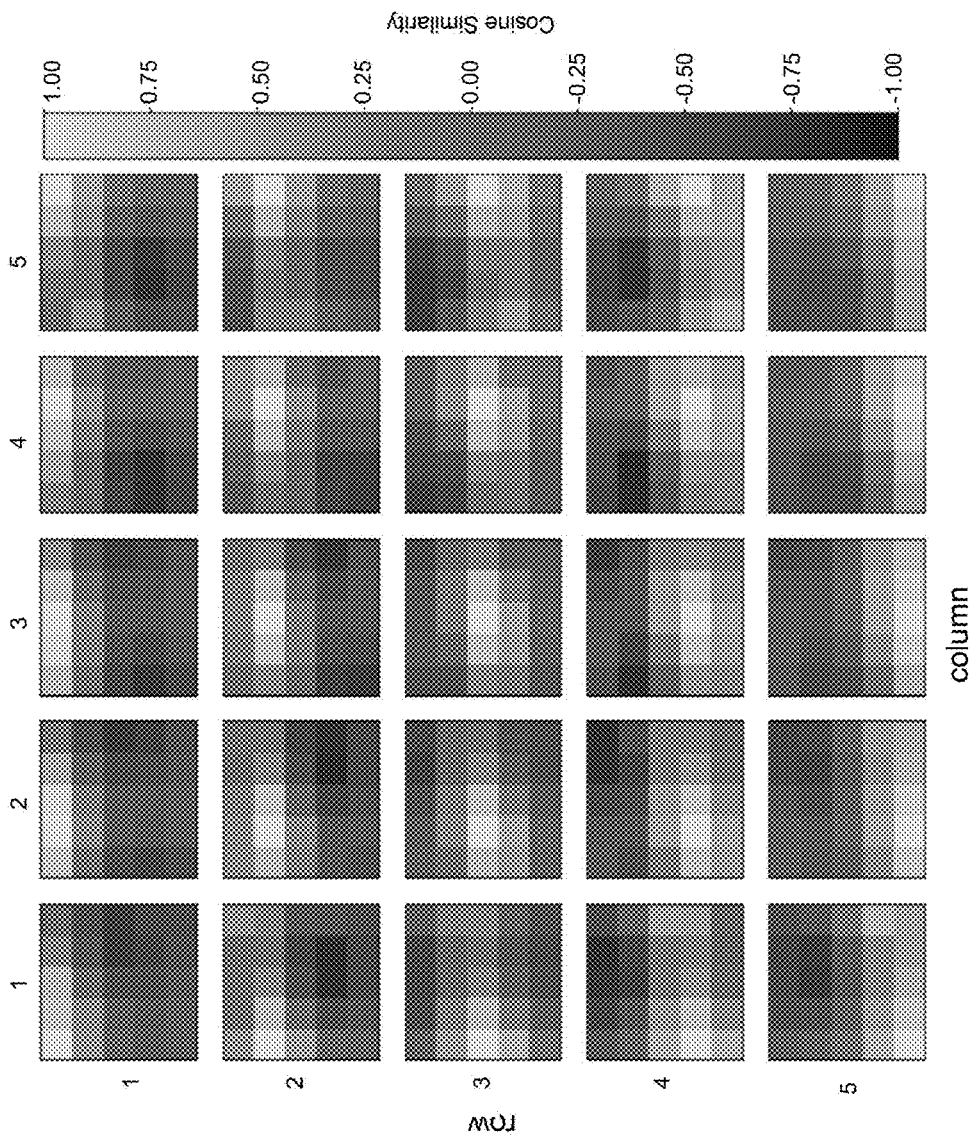
Figure 7C:
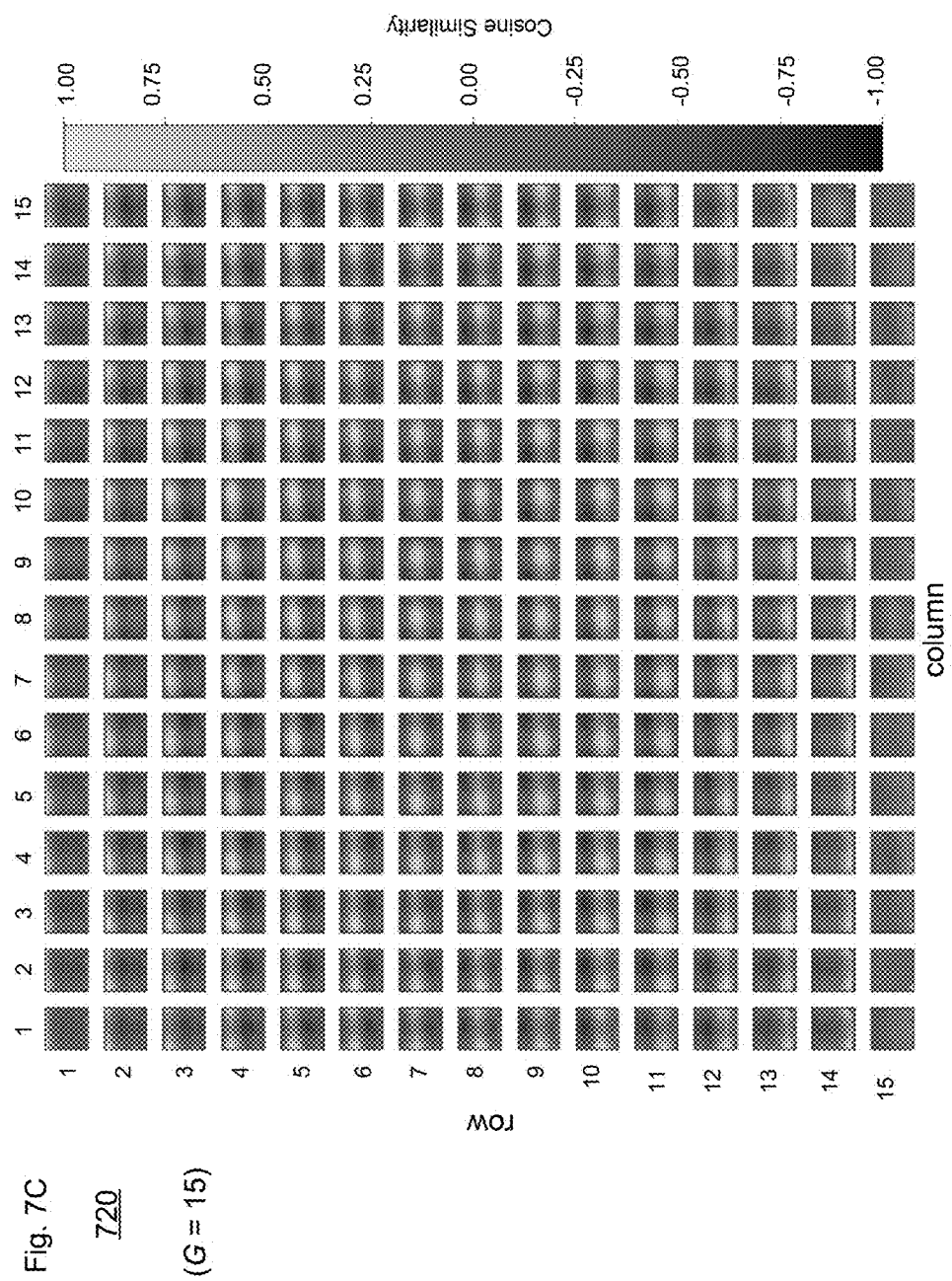
Figure 8A:
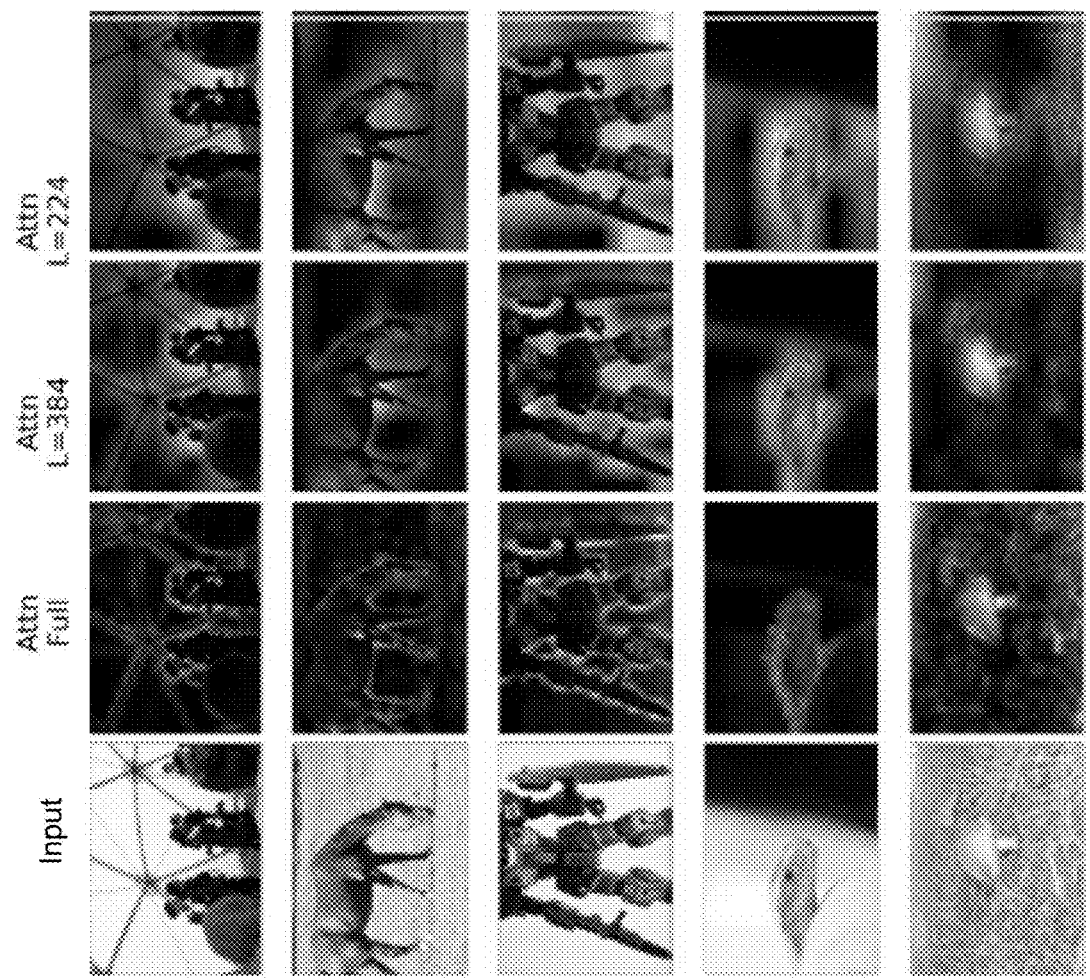
FIGS. 8A-D illustrate visualizations for each image in a multi-scale representation, in accordance with aspects of the technology.
Figure 8B:
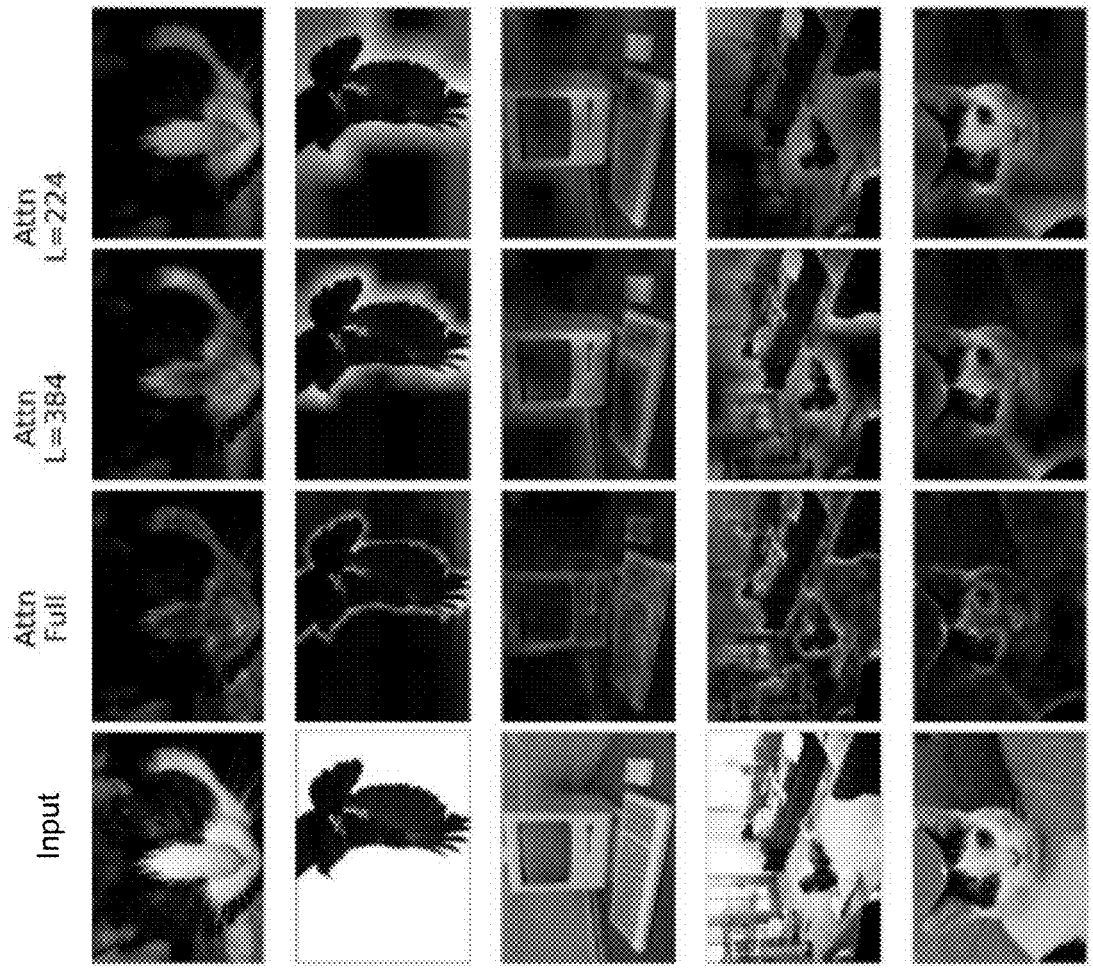
Figure 8C:
Figure 8D:
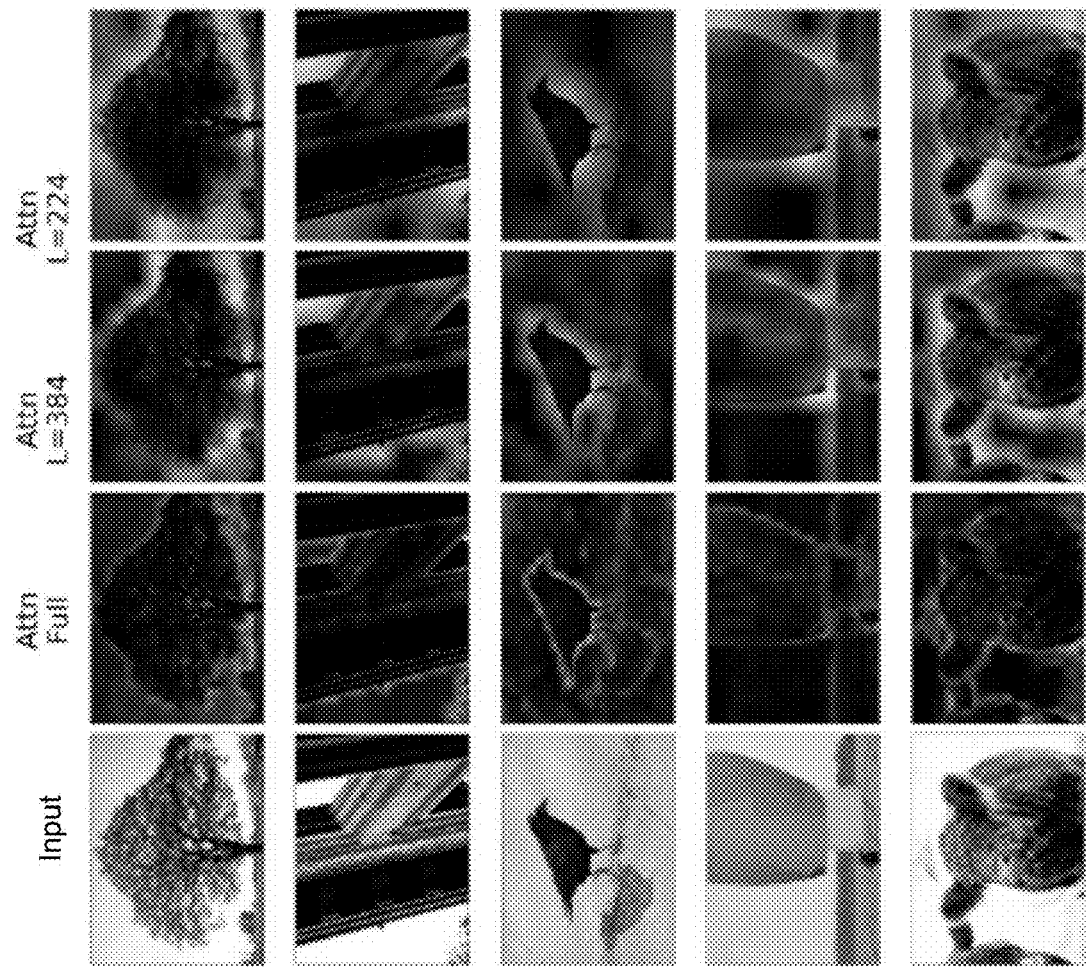

Visualizations of the learned HSE cosine similarity are provided in views 700 of FIG. 7A (G=10), view 710 of FIG. 7B (G=5) and view 720 of FIG. 7C (G=15). As presented in these views, the HSE of spatially close locations are more similar (lighter shading or color, or otherwise brighter in the same general locations), and it corresponds well to the 2D structure. For example, the bottom HSEs are brightest at the bottom. This shows that HSE can effectively capture the 2D structure of the image.

Table 6 shows that adding SCE can further improve performance when compared with not adding SCE. This table shows that SCE is helpful for the model to capture scale information independently of the spatial information.

TABLE 6

Ablation study results for scale embeddings on AVA

| Scale Embedding | SRCC | PLCC |
| --- | --- | --- |
| w/o embedding | 0.717 | 0.729 |
| with embedding | 0.726 | 0.738 |

Different designs for encoding the patch could be employed, including linear projection and small numbers of convolutional layers. As shown in Table 7, using a simple convolution-based patch encoding module can boost the performance. For simple cony, the root of ResNet is used (a 7×7 conv followed by a 3×3 cony). For 5-layer ResNet, a residual block is stacked on top of Simple Convolution. Adding more convolution layers can have diminishing returns and it is seen that a 5-layer ResNet can provide satisfactory representation for the patch.

TABLE 7

Comparison of different patch encoding modules on AVA dataset

|  | # Parameters | SRCC | PLCC |
| --- | --- | --- | --- |
| Linear Projection | 22M | 0.703 | 0.716 |
| Simple Convolution | 23M | 0.717 | 0.731 |
| 5-layer ResNet | 27M | 0.726 | 0.738 |

And an evaluation of the effect of patch size is shown in Table 8. Here, ablation was run on different patch sizes P. It can be seen in this set of results that a patch size P=32 had the most effective performance.

TABLE 8

Comparison of different patch sizes on AVA dataset

| | Patch Size | | | |
| --- | --- | --- | --- | --- |
| | 16 | 32 | 48 | 64 |
| SRCC | 0.715 | 0.726 | 0.713 | 0.705 |
| PLCC | 0.729 | 0.738 | 0.727 | 0.719 |

Figure 10:
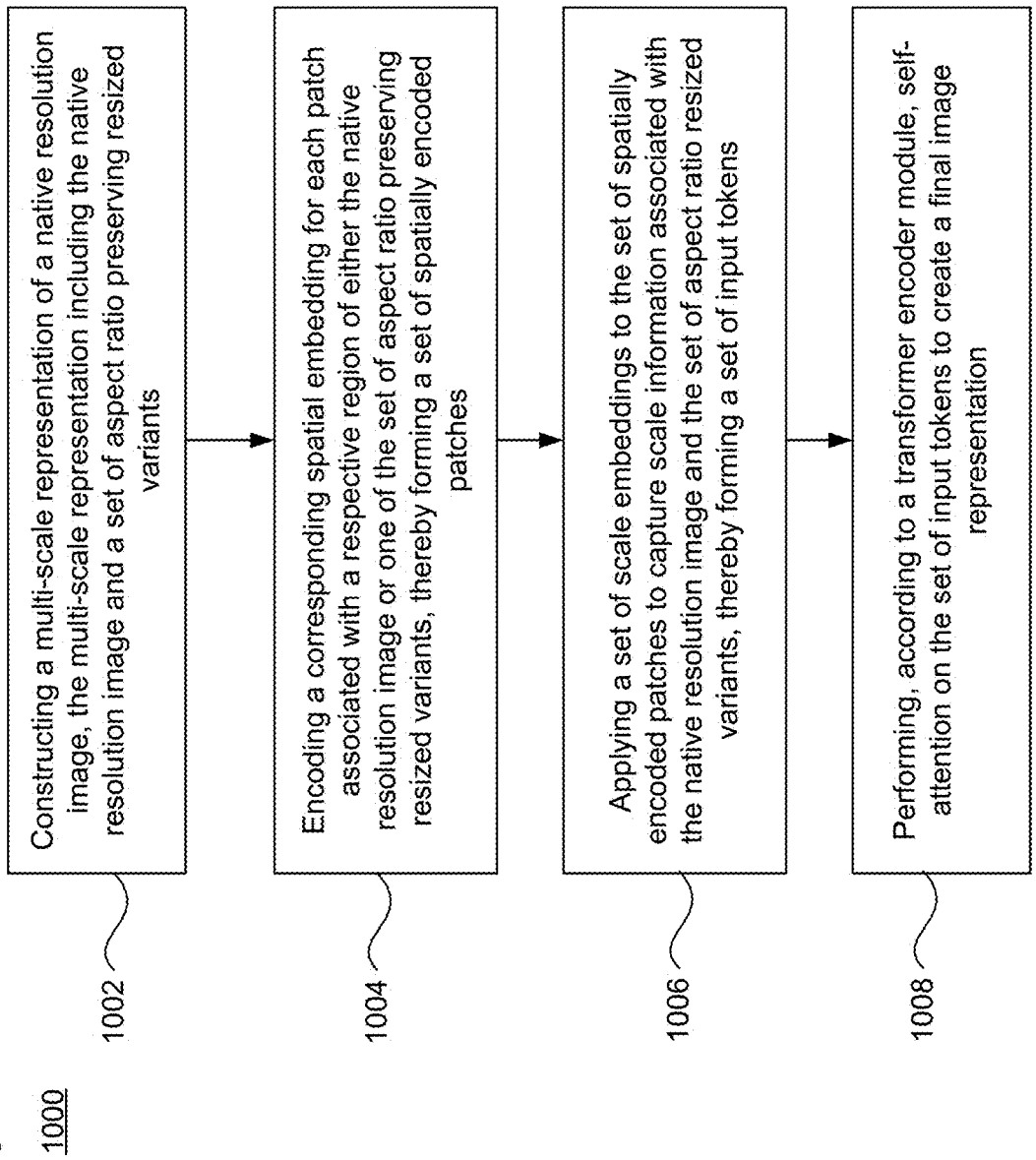
FIG. 10 illustrates a method in accordance with aspects of the technology.

FIG. 10. Visualizations of attention from the output tokens to the multi-scale representation. "Input" column shows the input image. "Attn Full" shows the attention on the full-size image. "Attn L=384" and "Attn L=224" show the attention on the ARP resized images. Note that images here are resized to fit the grid, the model inputs are 3 different resolutions.

To understand how the system uses self-attention to integrate information across different scales, the average attention weight from the output tokens to each image can be visualized for the multi-scale representation. Examples of this are presented in views 800, 810, 820 and 830 of FIGS. 8A-D, respectively. In these examples, the attention weights are averaged across all heads and then recursively multiplied, accounting for the mixing of attention across tokens through all layers.

Figure 9B:
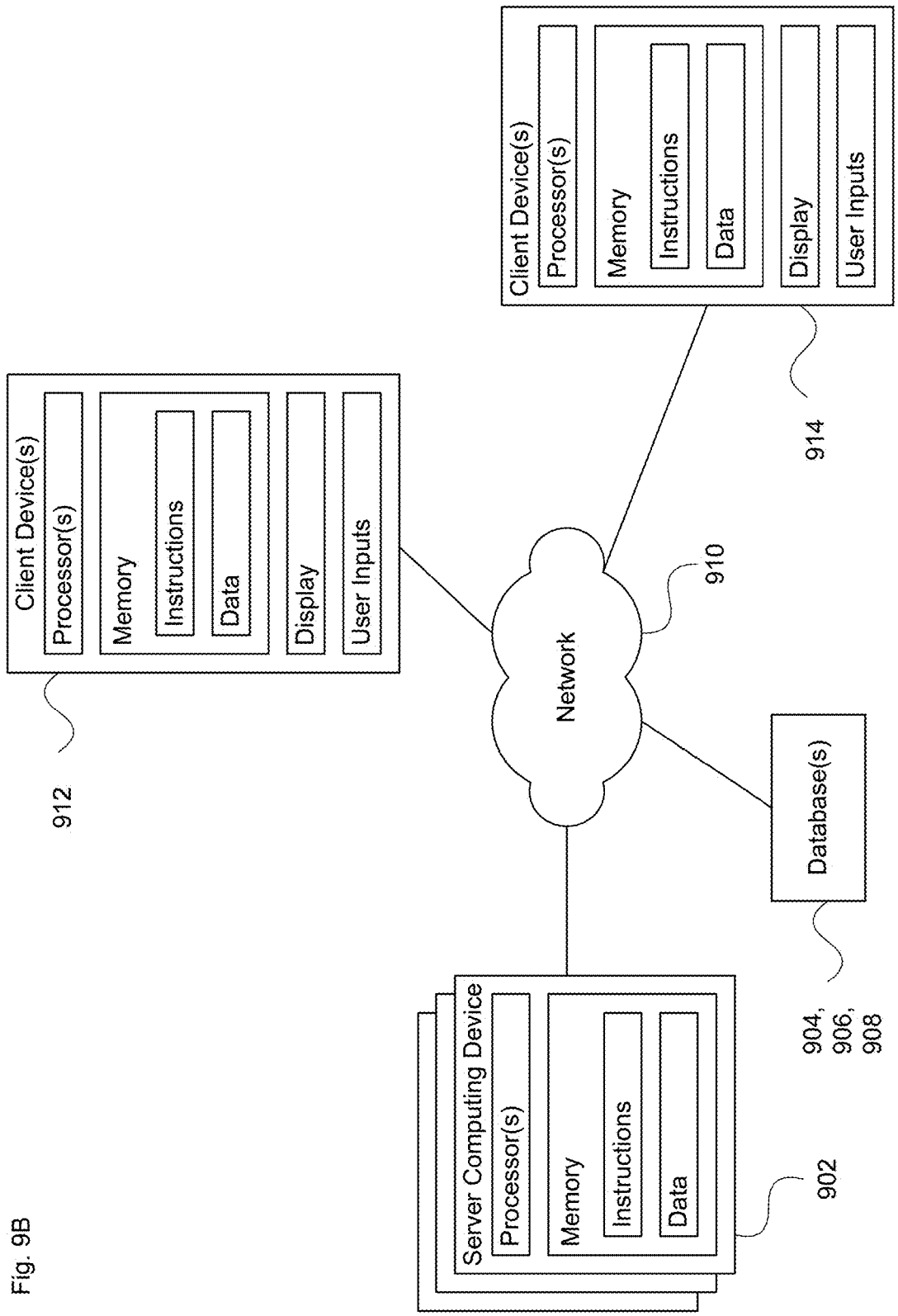
FIGS. 9-B illustrate a system for use with aspects of the technology.

TPU, CPU or other computing architectures can be employed to implement a patch-based multi-scale Transformer in accordance with the features disclosed herein. One example computing architecture is shown in FIGS. 9A and 9B. In particular, FIGS. 9A and 9B are pictorial and functional diagrams, respectively, of an example system 900 that includes a plurality of computing devices and databases connected via a network. For instance, computing device(s) 902 may be a cloud-based server system. Databases 904, 906 and 908 may store, e.g., the original full-sized images, multi-scale representations and/or Transformer modules (such as the Transformer encoding module, the patch encoding module, etc.), respectively. The server system may access the databases via network 910. Client devices may include one or more of a desktop computer 912 and a laptop or tablet PC 914, for instance to provide the original images and/or to view the output visualizations.

As shown in FIG. 9B, each of the computing devices 902 and 912-914 may include one or more processors, memory, data and instructions. The memory stores information accessible by the one or more processors, including instructions and data (e.g., models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data may be stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs, TPUs, graphical processing units (GPUs), etc. Alternatively, each processor may be a dedicated device such as an ASIC or other hardware-based processor. Although FIG. 9B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 902. Accordingly, references to a processor or computing device will be understood to include references to a collection of processors or computing devices or memories that may or may not operate in parallel.

The input data, such as one or more original, full-sized images, may be operated on by a Transformer module to generate one or more multi-scale representations, image quality assessment data, etc. The client devices may utilize such information in various apps or other programs to perform image ranking, image recommendations, image classification and/or bad image filtering.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 912-914) may communicate with a back-end computing system (e.g., server 902) via one or more networks, such as network 910. The network 910, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 902 may include one or more server computing devices that are capable of communicating with any of the computing devices 912-914 via the network 910.

Image quality assessment information or other data derived from the Transformer module(s), the module(s) itself, multi-scale representations, or the like may be shared by the server with one or more of the client computing devices. Alternatively or additionally, the client device(s) may maintain their own databases, Transformer modules, etc.

FIG. 10 illustrates a method 1000 for processing imagery in accordance with aspects of the technology. The method includes, at block 1002, constructing a multi-scale representation of a native resolution image. The multi-scale representation includes the native resolution image and a set of aspect ratio preserving resized variants. At block 1004, the method includes encoding a corresponding spatial embedding for each patch associated with a respective region of either the native resolution image or one of the set of aspect ratio preserving resized variants, thereby forming a set of spatially encoded patches. At block 1006, the method includes applying a set of scale embeddings to the set of spatially encoded patches to capture scale information associated with the native resolution image and the set of aspect ratio resized variants, thereby forming a set of input tokens. And at block 1008, the method includes performing, according to a transformer encoder module, self-attention on the set of input tokens to create a final image representation.

The patch-based multi-scale Transformer approaches discussed herein are advantageous for a number of reasons and have wide applicability. By way of example, applications for which the technology can be used include IQA, image classification, image representation learning where tasks need to learn a representation of the image, and multi-modality learning (both text and image). The predicted quality scores can be further utilized in applications like image ranking, image recommendations, and bad image filtering. The technology is also applicable on subtasks in IQA, such as estimating some technical attributes (e.g., brightness, contrast, compression rate) of the image. Image classification with the approaches discussed herein can involve, e.g., general object classification tasks, as well as classification in biology or medicine where images should not be resized. The system can represent both text and image as tokens and perform multimodality learning.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for processing imagery, the method comprising:
    encoding, by one or more processors for a set of images including a native resolution image and one or more resized variants of the native resolution image, a corresponding spatial embedding for each patch associated with a respective region of either the native resolution image or a given one of the one or more resized variants, to form a set of spatially encoded patches;
    applying, by one or more processors, a set of scale embeddings to the set of spatially encoded patches to capture scale information associated with the native resolution image and the given one of the one or more resized variants to form a set of input tokens; and
    creating, by one or more processors a final image representation via a self-attention process on the set of input tokens.

2. The method of claim 1, wherein the final image representation corresponds to a predicted quality score of the native resolution image.

3. The method of claim 1, further comprising constructing a multi-scale representation of the native resolution image, the multi-scale representation including the native resolution image and the one or more resized variants.

4. The method of claim 3, wherein the one or more resized variants form a set of aspect ratio preserving resized variants.

5. The method of claim 3, wherein constructing the multi-scale representation includes splitting the native resolution image and each resized variant into fixed-size patches, wherein each patch represents a region of either the native resolution image or one of the resized variants.

6. The method of claim 3, wherein the multi-scale representation includes the native resolution image with height H, width W and one or more channels C, and one or more resized variants are derived using a Gaussian kernel, wherein each channel represents a color component of the native resolution image.

7. The method of claim 1, wherein encoding the corresponding spatial embedding includes hashing a patch position for each patch within a grid of learnable embeddings.

8. The method of claim 1, wherein each resized variant is formed so that an aspect ratio of that variant is sized according to a longer side of the native resolution image.

9. The method of claim 1, further comprising aligning the set of spatially encoded patches across scales, by mapping patch locations from all scales to a grid.

10. The method of claim 1, further comprising, prior to the self-attention process, prepending a learnable classification token to the set of input tokens.

11. The method of claim 1, wherein the self-attention process includes performing multi-head self-attention on the set of input tokens.

12. The method of claim 11, wherein performing the multi-head self-attention comprises:
performing a first normalization on the set of input tokens to generate a set of first normalizations;
performing a multi-head self-attention operation on the set of first normalizations;
performing a second normalization on output of the multi-head self-attention operation to generate a second normalization; and
performing a multi-layer perceptron process on the second normalization to create a final image representation.

13. The method of claim 12, wherein the second normalization is performed on the output of the multi-head self-attention operation added to a residual connection from the set of input tokens.

14. The method of claim 13, wherein the final image representation is obtained by adding input from the second normalization to output from the multi-layer perceptron process.

15. The method of claim 1, further comprising pretraining a transformer on a selected image dataset.

16. The method of claim 1, wherein a patch size is selected based on an average resolution across the native resolution image and the one or more resized variants.

17. An image processing system, comprising:
memory configured to store imagery; and
one or more processors operatively coupled to the memory, the one or more processors being configured to
encode, for a set of images including a native resolution image and one or more resized variants of the native resolution image, a corresponding spatial embedding for each patch associated with a respective region of either the native resolution image or a given one of the one or more resized variants, to form a set of spatially encoded patches;
apply a set of scale embeddings to the set of spatially encoded patches to capture scale information associated with the native resolution image and the given one of the one or more resized variants, to form a set of input tokens; and
create a final image representation via self-attention on the set of input tokens.

18. The image processing system of claim 17, wherein the one or more processors are further configured to store in the memory at least one of the final image representation, the native resolution image, or the one or more resized variants.

19. The image processing system of claim 17, wherein the final image representation corresponds to a predicted quality score of the native resolution image.

20. The image processing system of claim 17, wherein the one or more resized variants form a set of aspect ratio preserving resized variants.

21. The image processing system of claim 17, wherein the one or more processors are further configured, prior to the self-attention, to prepend a learnable classification token to the set of input tokens.

22. The image processing system of claim 17, wherein each resized variant is formed so that an aspect ratio of that variant is sized according to a longer side of the native resolution image.

* * * * *